US008609574B2

(12) United States Patent
Rhodes et al.

(10) Patent No.: US 8,609,574 B2
(45) Date of Patent: Dec. 17, 2013

(54) IN SITU OLEFIN POLYMERIZATION CATALYST SYSTEM

(75) Inventors: Larry F. Rhodes, Silver Lake, OH (US); Luis Francisco Martin, Zaragoza (ES); Andrew Bell, Lakewood, OH (US)

(73) Assignee: Promerus LLC, Brecksville, OH (US)

( * ) Notice: Subject to any disclaimer, the term of this patent is extended or adjusted under 35 U.S.C. 154(b) by 287 days.

(21) Appl. No.: 12/428,936

(22) Filed: Apr. 23, 2009

(65) Prior Publication Data

US 2009/0270247 A1    Oct. 29, 2009

Related U.S. Application Data

(60) Provisional application No. 61/047,812, filed on Apr. 25, 2008.

(51) Int. Cl.
*C08F 4/80* (2006.01)

(52) U.S. Cl.
USPC ........... 502/152; 502/159; 502/169; 526/171; 526/281; 526/282; 526/284

(58) Field of Classification Search
USPC .......... 502/151, 150, 155; 526/171, 281, 282, 526/284
See application file for complete search history.

(56) References Cited

U.S. PATENT DOCUMENTS

| | | | |
|---|---|---|---|
| 5,362,423 A | 11/1994 | Ikeda et al. | |
| 5,600,004 A * | 2/1997 | Diefenbach | 568/1 |
| 5,891,963 A | 4/1999 | Brookhart et al. | |
| 6,136,499 A | 10/2000 | Goodall et al. | |
| 6,174,975 B1 | 1/2001 | Johnson et al. | |
| 6,232,417 B1 | 5/2001 | Rhodes et al. | |
| 6,455,650 B1 * | 9/2002 | Lipian et al. | 526/171 |
| 6,613,915 B1 | 9/2003 | Johnson et al. | |
| 6,660,677 B1 | 12/2003 | Mackenzie et al. | |
| 6,825,307 B2 | 11/2004 | Goodall | |
| 7,022,790 B2 | 4/2006 | Elce et al. | |
| 7,098,165 B2 * | 8/2006 | Weiss | 502/150 |
| 7,259,214 B2 | 8/2007 | Bazan et al. | |
| 7,456,329 B2 | 11/2008 | Wu et al. | |
| 7,459,510 B2 | 12/2008 | Lin et al. | |
| 2005/0090383 A1 * | 4/2005 | Thiele et al. | 502/152 |
| 2006/0287544 A1 | 12/2006 | Amoroso et al. | |
| 2008/0125555 A1 | 5/2008 | Matsunaga et al. | |

FOREIGN PATENT DOCUMENTS

WO    2006004376    1/2006

OTHER PUBLICATIONS

I.C. Appleby, "The Hazards of M-Trifluoromethylphenylmagnesium Bromide Preparation," Chemistry & Industry, London, United Kingdom, Issue 4, 1971.
Yoshiharu Inoue, "Useful Synthetic Routes to Pure exo-5-Vinyl-2-norbornene and endo-5-Vinyl-2-norbornene," The Chemical Society of Japan, vol. 6, No. 5, 1987.
Eric J. Moore, et al, "Metal Fluoride Stability," Chemical & Engineering News, vol. 75, Issue 11, 1997.
Terunobu Maeda, et al, "Rearrangement of 5-Vinyl-2-norbornene to 3a,4,7,7a-Tetrahydroindene," Nippon Kagaku Kaishi, No. 8, 1974.
Shaw-Tao Lin, et al, "Synthesis of ($n^\wedge$6-Arene)NlR2 and CoR2 (R=o-Bound Halosilanes and Haloarenes) by (Aliyl) 2Ni/HR Reactions and Combined Metal Trifluoroacetate/Grignard Reagent Methods," Organometallics, vol. 4, 1985.
Daniel L. Reger, et al, "Sodium Tetrakis(3,5-bis(trifluoromethyl)phenyl)borate, Na[B(3,5-(CF3)2C6H3)4]," Inorganic Synthesis, vol. 34, 2004.
International Search Report for PCT/US09/41613 Mailed Jun. 11, 2009.
Written Opinion for PCT/US09/41613 Mailed Jun. 11, 2009.

\* cited by examiner

*Primary Examiner* — Melvin C Mayes
*Assistant Examiner* — Colette Nguyen
(74) *Attorney, Agent, or Firm* — Turocy & Watson, LLP

(57) ABSTRACT

Embodiments in accordance with the present invention encompass methods of forming in situ olefin polymerization catalyst systems, catalysts encompassed by such systems and polymers made using such systems. For such in situ olefin polymerization catalyst systems, a hydrocarbyl magnesium halide is generally contacted with a halohydrocarbyl compound to form a halohydrocarbyl Grignard and such Grignard is generally contacted with a Group 10 metal compound to form an olefin polymerization catalyst which is contacted with one or more olefin monomers to form a polymer therefrom.

20 Claims, 14 Drawing Sheets

Figure 1: Comparative Catalyst Example 1 (NiArf)

Figure 2: Comparative Catalyst Example 2

Figure 3: Catalyst Example 1

Figure 4: Catalyst Example 2

Figure 5: Catalyst Example 3

Figure 6: Catalyst Example 4

Figure 7: Catalyst Example 5

Figure 8: Crystal structure of Catalyst Example 6

Figure 9: Catalyst Example 6

Figure 10: Crystal structure of Catalyst Example 7

Figure 11: Catalyst Example 7

Figure 12 : Catalyst Example 8

IN SITU OLEFIN POLYMERIZATION CATALYST SYSTEM

CROSS-REFERENCE TO RELATED APPLICATIONS

This application claims the benefit of priority to Provisional Application Ser. No. 61/047,812 filed on Apr. 25, 2008, which is incorporated herein by reference.

TECHNICAL FIELD

Described herein are Group 10 metal containing cycloolefin polymerization catalysts, methods of making the polymerization catalysts, and methods of polymerizing cycloolefins using the polymerization catalysts.

BACKGROUND

Cycloolefin polymers such as norbornene polymers are valuable as insulating materials in the electronics field due to excellent dielectric properties and low water absorption properties. Of the cycloolefin polymers, cycloolefin addition polymers typified by norbornene addition polymers are generally suitable for use as various kinds of moldings, sealing materials for electronic parts, and insulating materials, owing to various properties such as low moisture-absorption and excellent dielectric properties.

Cycloolefin polymers in general and norbornene-type polymers in particular can be made using nickel catalysts. For example, U.S. Pat. No. 6,136,499 describes the use of $E_nNi(C_6F_5)_2$ (where n=1 or 2 and where E is a neutral electron donor ligand). Where E is toluene, such catalyst is made by the reaction of suitable starting materials such nickel(II) trifluoroacetate and $C_6F_5MgBr$ (Brezinski and Klabunde in Organometallics, 1983, 2, 1116). Such nickel catalysts are made using fluorinated aryl Grignard reagents.

However, handling of fluorinated Grignard reagents raises safety concerns. There have been reports of explosions associated with fluorinated aryl magnesium halides (See, a) Appleby, Chem. Ind. (London) 1971, 4, 120, b) Moore and Waymouth, Chem. Eng. News 1997, 75(11), 6, and c) Reger, et al. Inorg. Synth. 2004, 34, 5-8).

In Organometallics, 2005, 24, 3579 the synthesis of [3,5-bis(trifluoromethyl)phenyl] magnesium bromide is described using $^iPrMgCl$ via Knochel's procedure described in Tetrahedron Letters 1999, 40, 7449. In this article it is reported: "The recent report by Leazer et al. confirms that while [3,5-bis(trifluoromethyl)phenyl] magnesium bromide is not a hazard by itself, explosive exothermic decompositions of (trifluoromethyl)aryl Grignard reagents occurs in the presence of any excess magnesium metal". Leazer describes Knochel's procedure as "safe and reliable" and highlights that: "We found Knochel's procedure [ . . . ] to be the best method for the preparation of (trifluoromethyl)phenyl Grignard reagents. [ . . . ] showed no propensity toward runaway reactions. [ . . . ] and suitable for multi-kilogram scale-up" (J. Org. Chem. 2003, 23, 3695). Knochel's procedure consists of halogen-magnesium exchange. The synthesis of $C_6F_5MgBr$ and other fluorinated aryl Grignards via Knochel's procedure is described in Tetrahedron Letters 1999, 40, 7449, which is incorporated herein by reference.

BRIEF DESCRIPTION OF THE DRAWINGS

Embodiments of the invention are described below with reference to the following accompanying drawings.

DETAILED DESCRIPTION

Figure 1:
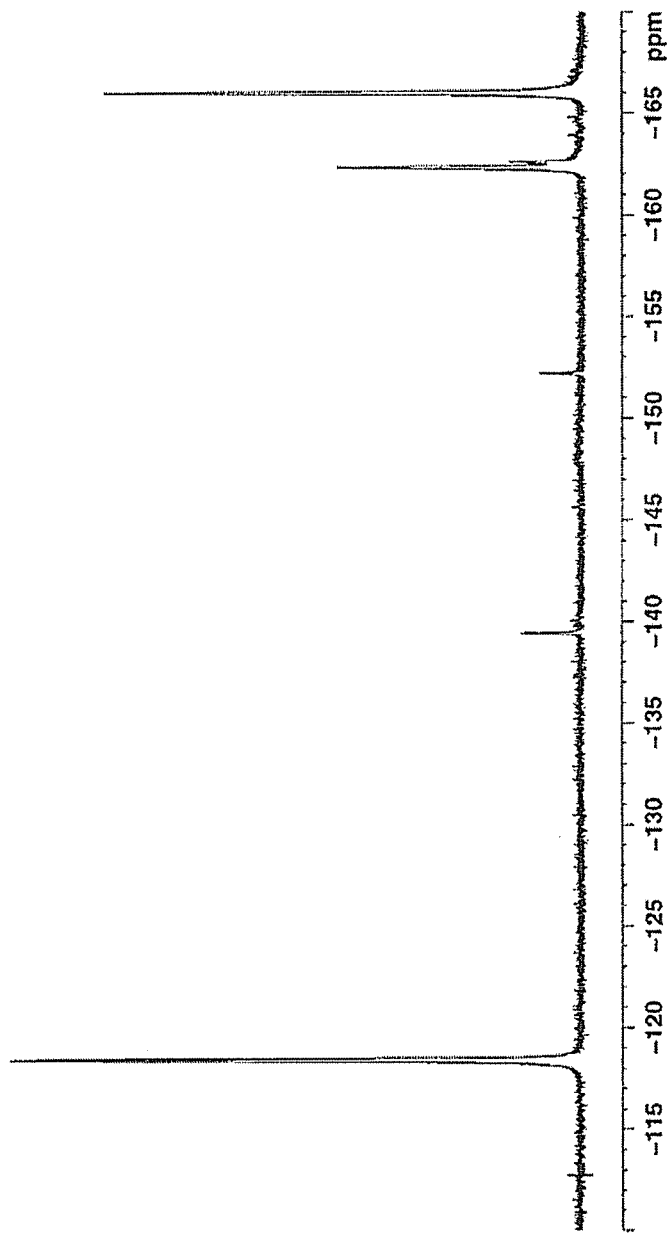
FIG. 1 shows a $^{19}F$ NMR spectrum of $(\eta^6\text{-toluene})Ni(C_6F_5)_2$ in a mixture of toluene and thf as described in Comparative Example 1.

The in situ olefin polymerization catalyst system in accordance with embodiments of the present invention encompasses the forming of halohydrocarbyl Grignard via contacting a hydrocarbyl magnesium halide, dialkylmagnesium or lithium trialkylmagnesate with a halohydrocarbyl compound in a suitable solvent; the forming of an olefin polymerization catalyst via contacting the halohydrocarbyl Grignard with a Group 10 metal compound in the same or another suitable solvent; and contacting the catalyst with one or more polymerizable olefin monomers provided in a suitable polymerization solvent. In this manner, the catalyst can initiate polymerization of such monomers and it can be said that catalysts formed in accordance with embodiments of the present invention are Group 10 metal-containing in situ polymerization catalysts.

The in situ olefin polymerization catalyst system, including the aforementioned Group 10 metal-containing in situ polymerization catalysts, the methods of making such catalysts and use of the aforementioned system for the polymerization of olefins, reduces or eliminates the need to handle isolated fluorinated Grignard reagents and thus reduces or eliminates the safety concerns associated with such fluorinated Grignard reagents.

To the accomplishment of the foregoing and related ends, embodiments in accordance with the present invention are described hereinafter and pointed out in the claims. To advance that purpose, the following description and annexed drawings set forth in detail certain illustrative aspects and implementations of the several embodiments of the present invention. As these are indicative, however, of but a few of the various ways in which the principles of the invention may be employed, one should realize that other advantages and features of the invention will become apparent from these teachings where such other features and advantages are within the scope of the present invention.

The following abbreviations are used herein:
$^i$Pr: Isopropyl
thf: Tetrahydrofuran CAS: [109-99-9]
DME: 1,2-Dimethoxyethane CAS: [110-71-4]
EtOAc: Ethyl acetate CAS: [141-78-6]
MAK: Methyl amyl ketone [110-43-0]
MEK: Methyl ethyl ketone [78-93-3]
RT: room temperature
Ni(Ethex)$_2$: Nickel(II) 2-ethylhexanoate CAS: [4454-16-4]
[Ni(acac)$_2$]: Nickel(II) acetylacetonate CAS: [3264-82-2]
Ni(stearate)$_2$: Nickel(II) stearate CAS: [2223-955-2]
Ni(tmhd)$_2$, Nickel(II) tetramethylheptanedionate CAS: [41749-92-2]
Ni(hfacac)$_2$, Nickel(II) hexafluoroacetylacetonate CAS: [14949-69-0]
Ni(tfacac)$_2$, Nickel(II) trifluoroacetylacetonate CAS: [14324-83-5]
Ni(dbm)$_2$, Nickel(II) dibenzoylmethanate CAS: [14552-54-6]
Ni(bac)$_2$, Nickel(II) benzoylacetonate CAS: [14405-47-1]
Li$_2$[NiBr$_4$]: Dilithium tetrabromonickelate(II) solution (0.5 M in THF) CAS: [13826-95-4]
[Cu(acac)$_2$]: Copper(II) acetylacetonate CAS: [13395-16-9]
[Co(acac)$_3$]: Cobalt(III) acetylacetonate CAS: [21679-46-9]
[Ag(acac)]: Silver acetylacetonate CAS: [15525-64-1]
[Rh(acac)$_3$]: Rhodium(III) acetylacetonate CAS: [14284-92-5]
[Pd(acac)$_2$]: Palladium(II) acetylacetonate CAS: [14024-61-4]
MGENB: methyl glycidyl ether norbornene CAS: [3188-75-8]
DeNB: 5-decyl-2-norbornene CAS: [22094-85-5]
PENB: phenethyl norbornene CAS: [29415-09-6]
TESNB: triethoxysilyl norbornene CAS: [7538-46-7]
MeOAcNB: 5-norbornene-2-methanol acetate CAS: [10471-24-6]
HFANB: hydroxyhexafluoroisopropylmethylnorbornene CAS: [196314-61-1]
TFSNB: N-(Bicyclo[2.2.1]hept-5-en-2-ylmethyl)-1,1,1-trifluoromethanesulfonamide CAS: [287923-92-6]
tBuEsNB: Bicyclo[2,2,1]hept-5-ene-2-tert-butylcarboxylate CAS: [154970-45-3]
Mn: number average molecular weight;
Mw: weight average molecular weight; and
PD: Polydispersity (Mw/Mn).

As used herein, the term "polymer" will be understood to also encompass, in addition to the polymer itself, residues from initiators, catalysts and other elements attendant to the synthesis of such a polymer, where such residues are understood as not being covalently incorporated thereto. Further, such residues and other elements, while normally removed during post polymerization purification processes, are typically mixed or co-mingled with the polymer such that they generally remain with the polymer when it is transferred between vessels or between solvents or dispersion media.

As defined herein, the terms "olefin", "polycycloolefin", "polycyclic olefin", and "norbornene-type" are used interchangeably and refer to addition polymerizable monomers, or the resulting repeating unit, encompassing at least one norbornene moiety such as shown by either Structure A1 or A2, below:

A1

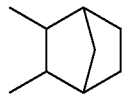

A2

The simplest norbornene-type or polycyclic olefin monomer that can be polymerized using the catalyst systems of the present invention include the bicyclic monomer, bicyclo[2.2.1]hept-2-ene, commonly referred to as norbornene. However, the term norbornene-type monomer or repeating unit, as used herein, is understood to not only mean norbornene itself but also to refer to any substituted norbornene, or substituted and unsubstituted higher cyclic derivatives thereof, for example where m of Structures B1 and B2, shown below, is greater than zero.

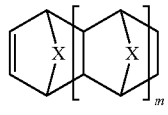

B1

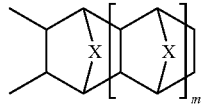

B2

As used herein, "hydrocarbyl" refers to a radical or group that contains a carbon backbone where each carbon is appropriately substituted with one or more hydrogen atoms. The term "halohydrocarbyl" refers to a hydrocarbyl group where one or more of the hydrogen atoms, but not all, have been replaced by a halogen (F, Cl, Br, I). The term perhalocarbyl refers to a hydrocarbyl group where each hydrogen has been replaced by a halogen. Non-limiting examples of hydrocarbyls, include, but are not limited to $C_1$-$C_{25}$ alkyl, $C_2$-$C_{24}$ alkenyl, $C_2$-$C_{24}$ alkynyl, $C_5$-$C_{25}$ cycloalkyl, an $C_6$-$C_{24}$ aryl, or an $C_7$-$C_{24}$ aralkyl. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, decyl and dodecyl. Representative alkenyl groups include but are not limited to vinyl, 1-propenyl, 2-propenyl, 1-butenyl and 2-butenyl. Representative alkynyl groups include but are not limited to ethynyl, 1-propynyl, 2-propynyl, 1-butynyl, and 2-butynyl. Representative cycloalkyl groups include but are not limited to cyclopentyl, cyclohexyl, and cyclooctyl. Representative aryl groups include but are not limited to phenyl, biphenyl, naphthyl, and anthracenyl. Representative aralkyl groups include but are not limited to benzyl, phenethyl, and phenbutyl.

The term halohydrocarbyl as used throughout the present specification is inclusive of the hydrocarbyl moieties mentioned above but where there is a degree of halogenation that can range from at least one hydrogen atom being replaced by a halogen atom (e.g., a fluoromethyl group) to where all hydrogen atoms on the hydrocarbyl group have been replaced by a halogen atom (e.g., trifluoromethyl or perfluoromethyl), also referred to as perhalogenation. For example, halogenated alkyl groups useful in embodiments of the present invention are partially or fully halogenated, alkyl groups of the formula $C_zX_{2z+1}$ wherein X is independently a halogen or a hydrogen and z is selected from an integer of 1 to 20. In some embodiments each X is independently selected from hydrogen, chlorine, fluorine, bromine, and/or iodine. In other embodiments each X is independently either hydrogen or fluorine. Thus, representative halohydrocarbyls and perhalocarbyls are exemplified by the aforementioned exemplary hydrocarbyls where an appropriate number of hydrogen atoms are each replaced with a halogen atom.

Norbornene-type or polycyclic olefin monomers may be represented by the following Formula C:

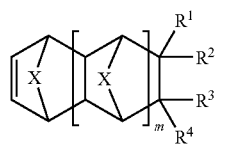

(C)

where X is selected from —CH$_2$—, —CH$_2$—CH$_2$—, or —O—; m is an integer from 0 to 5; and $R^1$, $R^2$, $R^3$, and $R^4$ are each independently selected from hydrogen, a hydrocarbyl containing from 1 to 20 carbon atoms, a halohydrocarbyl containing from 1 to 20 carbon atoms, and a perhalocarbyl containing from 1 to 20 carbon atoms.

In some embodiments in accordance with the present invention, each of $R^1$, $R^2$, $R^3$, and $R^4$ is independently selected from hydrogen, a hydrocarbyl group, a halohydrocarbyl group, or a perhalocarbyl group. Additionally, in some embodiments one of $R^1$ or $R^2$ and one of $R^3$ and $R^4$ can be taken together to represent a $C_1$-$C_{10}$ alkylidenyl group. Representative alkylidenyl groups include, among others, methylidenyl, and ethylidenyl groups.

In other embodiments in accordance with the invention, one or more of $R^1$, $R^2$, $R^3$, and $R^4$ is a $C_1$ to $C_{20}$ hydrocarbyl, halohydrocarbyl or perhalocarbyl group, where such hydrocarbyl, halohydrocarbyl or perhalocarbyl group encompasses one or more heteroatoms selected from O, N, S, P and Si, and the others of $R^1$, $R^2$, $R^3$, and $R^4$ are H. Exemplary groups encompassing heteroatoms are represented by the formula:

-A-Y where A is an optional bridging group encompassing a $C_1$ to $C_{20}$ hydrocarbyl, halohydrocarbyl or perhalocarbyl group or such a group that encompasses one or more heteroatoms selected from O, N, S, P and Si and Y is a functional group including, but not limited to, a substituted or unsubstituted maleimido, a trialkoxysilyl, a hydroxyalkyl acetate, a hydroxyperfluoroalkyl, an alkylglycidyl ether or other epoxy-containing group, a perfluoroalkylsulfonamide and a carboxylic acid derivative such as an ester or anhydride.

Some specific examples of norbornene-type monomers useful in the practice of embodiments in accordance with the present invention include, Examples of polymerizable norbornene-type monomers include norbornene (bicyclo[2.2.1]hept-2-ene), MGENB, DeNB, PENB, TESNB, MeOAcNB, HFANB, TFSNB, t-BuEsNB, 5-ethylidenenorbornene, 5-methylidenenorborenene, dicyclopentadiene, 5-tricyclo[5.2.1.0$^{2,6}$]dec-8-ene, 5-methoxycarbonylbicyclo[2.2.1] hept-2-ene, bicyclo[2.2.1]hept-2-ene-5-isobutylcarboxylate, 5-methylbicyclo[2.2.1]hept-2-ene, 5-ethylbicyclo[2.2.1] hept-2-ene, 5-butylbicyclo[2.2.1]hept-2-ene, 5-ethoxycarbonylbicyclo[2.2.1]hept-2-ene, 5-n-propoxycarbonylbicyclo [2.2.1]hept-2-ene, 5-i-propoxycarbonylbicyclo[2.2.1]hept-2-ene, 5-n-butoxycarbonylbicyclo[2.2.1]hept-2-ene, 5-(2-methylpropoxy)-carbonylbicyclo[2.2.1]hept-2-ene, 5-(1-methylpropoxy)carbonylbicyclo[2.2.1]hept-2-ene, 5-t-butoxycarbonylbicyclo[2.2.1]hept-2-ene, 5-cyclohexyloxycarbonylbicyclo[2.2.1]hept-2-ene, 5-(4'-t-butylcyclohexyloxy)carbonylbicyclo[2.2.1]hept-2-ene, 5-phenoxycarbonylbicyclo[2.2.1]hept-2-ene, 5-tetrahydrofuranyloxycarbonylbicyclo[2.2.1]hept-2-ene, 5-tetrahydropyranyloxycarbonylbicyclo[2.2.1]hept-2-ene, and 5-acetyloxybicyclo[2.2.1]hept-2-ene.

Methods of making in situ olefin polymerization catalyst system embodiments of the present invention encompass making Group 10 metal initiators/Group 10 metal catalysts (hereinafter simply referred to as a Group 10 metal catalyst) that are safe, reliable (consistently lead to the production of the same polymer), and involve the use of readily available starting materials are described herein. The Group 10 metal catalysts so described can be used to polymerize the various olefin, cycloolefin and polycyclic olefin monomers described above, into polymers.

Group 10 metal catalysts in accordance with embodiments of the present invention are typically made in two steps. First, a hydrocarbyl magnesium halide is contacted with a halohydrocarbyl compound to form a halohydrocarbyl Grignard. Second, the halohydrocarbyl Grignard is contacted with a Group 10 metal compound to form the aforementioned Group 10 metal catalyst.

The above two steps are typically conducted in solution where the solvent(s) selected are suitable as polymerization solvents as well as being non-reactive with regard to the intermediate Grignard that is formed. In this manner, the Group 10 metal catalyst can be formed in situ and, if desired, can be immediately used for a polymerization reaction. Examples of solvents that may be used for the two steps (and subsequently to retain the resultant Group 10 metal catalyst) include alkane and cycloalkane solvents such as pentane, hexane, heptane, cyclohexane, 2,2,4-trimethylpentane (ISOPAR C), and octane; ethers such as thf, MeTHF, di-n-butyl ether, methyl-t-butyl ether, dialkyl glycol ethers, and diethylether; aromatic solvents such as benzene, xylene, toluene, p-cymene, naphthalene, mesitylene, tetralin, fluorobenzene, o-difluorobenzene, p-difluorobenzene, hexafluorobenzene, trifluorotoluene and mixtures thereof. The same or different solvent(s) may be used in each of the two steps.

In the first step described above, the hydrocarbyl magnesium halide is believed to act as a nucleophile which attacks an electrophilic carbon atom of the halohydrocarbyl compound. The hydrocarbyl magnesium halide can be represented by the formula RMgX where R is a hydrocarbyl group containing from 1 to 20 carbon atoms and X is a halogen atom, such as one of Cl, Br, or I.

General examples of appropriate hydrocarbyl magnesium halides encompass, among others, alkylmagnesium iodides, arylmagnesium iodides, alkylmagnesium chlorides, alkylmagnesium bromides, arylmagnesium chlorides, arylmagnesium bromides, alkenylmagnesium chlorides, alkenylmagnesium bromides. More specifically, such examples include benzylmagnesium iodide, n-butylmagnesium iodide, allylmagnesium chloride, benzylmagnesium chloride, benzylmagnesium chloride, n-butylmagnesium bromide, n-butylmagnesium chloride, t-butylmagnesium chloride, 4-chlorophenylmagnesium bromide, cyclohexylmagnesium chloride, cyclopentadienylmagnesium chloride, cyclopentylmagnesium chloride, cyclopropylmagnesium bromide, 3,5-dimethylphenylmagnesium bromide, ethylmagnesium bromide, ethylmagnesium chloride, n-heptylmagnesium bromide, n-hexylmagnesium bromide, isobutylmagnesium bromide, isobutylmagnesium chloride, isopropylmagnesium bromide, isopropylmagnesium chloride, 4-methoxyphenylmagnesium bromide, methylmagnesium bromide, methylmagnesium chloride, n-octylmagnesium chloride, n-pentylmagnesium bromide, n-pentylmagnesium chloride, phenylmagnesium bromide, phenylmagnesium chloride, n-propylmagnesium bromide, n-propylmagnesium chloride, 2-tolylmagnesium chloride, 4-tolylmagnesium chloride, [(trimethylsilyl)methyl]magnesium chloride, and vinylmagnesium bromide.

General examples of appropriate halohydrocarbyl compounds encompass, among others, haloaryl compounds including halobenzenes, haloalkylsubstituted halobenzenes, and halotoluenes, as well as haloalkyl compounds including branched haloalkyl compounds such as haloalkyl substituted methanes. Specific examples of halohydrocarbyl compounds encompass, among others, chloropentafluorobenzene, bromopentafluorobenzene, iodopentafluorobenzene, di-trifluoromethylbromobenzene, trifluoromethylbromobenzene, tri-trifluoromethylbromobenzene, difluorophenyl bromide, trifluorophenyl bromide, tetrafluorophenyl bromide, bromotrichlorobenzene, bromotetrachlorobenzene, bromopentachlorobenzene, 2,4,6-trifluoro-3,5-dichlorophenyl bromide, ditrifluoromethylfluorochloromethane, and pentafluorobenzene.

In the aforementioned first step, a suitable number of equivalents of the hydrocarbyl magnesium halide are contacted with a suitable number of equivalents of the halohydrocarbyl compound. Advantageously, it has been found that for some embodiments in accordance with the present invention, a ratio of such suitable number of equivalents encompasses from 3:1 to 1:3 (hydrocarbyl magnesium halide to the halohydrocarbyl compound). In another embodiment, a range of the equivalents ratio of the hydrocarbyl magnesium halide to the halohydrocarbyl compound is from 2:1 to 1:2, such as from 1.1:1 to 1:1.1 including 1:1. Typically, both the hydrocarbyl magnesium halide and the halohydrocarbyl compound are in solution when contacted. The hydrocarbyl magnesium halide solution can be added to the halohydrocarbyl compound solution, or the halohydrocarbyl compound solution can be added to the hydrocarbyl magnesium halide solution, or the two solutions can be combined simultaneously.

The hydrocarbyl magnesium halide is contacted with the halohydrocarbyl compound under suitable temperature to facilitate formation of the halohydrocarbyl Grignard. In one embodiment, the hydrocarbyl magnesium halide is contacted with the halohydrocarbyl compound at a temperature from about −10° C. to about 70° C. In another embodiment, the hydrocarbyl magnesium halide is contacted with the halohydrocarbyl compound at a temperature from about 0° C. to about 50° C. In still another embodiment, the hydrocarbyl magnesium halide is contacted with the halohydrocarbyl compound at a temperature from about 15° C. to about 40° C. Formation of the halohydrocarbyl Grignard as a consequence of contacting the hydrocarbyl magnesium halide with the halohydrocarbyl compound can be represented by the following chemical reaction scheme:

$R^H MgX + R^F X \rightarrow R^F MgX$ wherein $R^H$ is a hydrocarbyl group, X is independently Cl, Br or I and RF is a halohydrocarbyl group (typically a fluorohydrocarbyl group), but $R^F$ is more electronegative and/or more electron withdrawing than $R^H$. In this instance, selection and use of specific halohydrocarbyl compounds and hydrocarbyl magnesium halides in a given reaction depends on whether the halohydrocarbyl group of the halohydrocarbyl compound is more electronegative and/or more electron withdrawing than the hydrocarbyl group of the hydrocarbyl magnesium halide.

The halohydrocarbyl Grignard is typically composed of a halohydrocarbyl moiety (derived from the halohydrocarbyl compound) and a magnesium halide (derived from the hydrocarbyl magnesium halide). General examples of halohydrocarbyl Grignards encompass, among others, halophenylmagnesium halide, haloallylsubstituted phenylmagnesium halide, halotoluene magnesium halide, and haloalkyl substituted alkyl magnesium halide. Specific examples of halohydrocarbyl Grignards encompass, among others, pentafluorophenylmagnesium bromide, pentafluorophenylmagnesium chloride, di-trifluoromethyl-phenylmagnesium bromide, di-trifluoromethyl-phenylmagnesium chloride, tri-trifluoromethyl-phenylmagnesium bromide, tri-trifluoromethyl-phenylmagnesium chloride, trifluoromethylphenylmagnesium bromide, trifluoromethylphenylmagnesium chloride, difluorophenylmagnesium bromide, difluorophenylmagnesium chloride, trifluorophenylmagnesium bromide trifluorophenylmagnesium chloride, tetrafluorophenylmagnesium bromide, 2,4,6-trifluoro-3,5-dichlorophenylmagnesium bromide, di-trifluoromethyl-fluoro-methyl-magnesium chloride, di-trifluoromethyl-fluoro-methyl-magnesium bromide, trichlorophenylmagnesium bromide, trichlorophenylmagnesium chloride, tetrachlorophenylmagnesium bromide, tetrachlorophenyl magnesium chloride, pentachlorophenylmagnesium bromide, and pentachlorophenylmagnesium chloride.

In addition to the above described procedures and reagents to form a halohydrocarbyl Grignard useful in forming Group 10 metal catalysts in accord with the innovations disclosed herein, we believe that a reaction between dialkylmagnesium compounds and a halohydrocarbyl compound can form the useful halohydrocarbyl Grignards described above. We believe that alkylmagnesium chloride with lithium chloride which is sometimes called a Turbo-Grignard can react with a halohydrocarbyl compound to form the useful halohydrocarbyl Grignards described above. Examples of such diallylmagnesium include, but are not limited to, diethylmagnesium, diisopropylmagnesium, and dibutylmagnesium. Examples of Turbo-Grignards include, but are not limited to, iPrMgCl LiCl complex and sec-BuMgCl LiCl. Additionally, we believe that lithium trialkylmagnesates can react with halohydrocarbyl compounds to generate the useful halohydrocarbyl Grignards described above. Examples of such magnesates include, but are not limited to, lithium tri-n-butylmagnesate (n-Bu$_3$MgLi) and lithium dibutylisopropylmagnesate (i-Pr(n-Bu)$_2$MgLi). Reactions of dialkylmagnesium, Turbo-Grignards, or lithium trialkylmagnesates with halohydrocarbyl compounds are effective where the halohydrocarbyl compound contains an aryl functionality, such as pentafluorobenzene, chloropentafluorobenzene or bromopentafluorobenzene.

The Group 10 metal compounds useful for embodiments of the present invention have at least one of the following qualities/properties: reactivity with a halohydrocarbyl Grignard, solubility in an organic solvent, minimal or no water present, minimal or no acid species present, or high purity. Additionally, such Group 10 metal compound contains at least one Group 10 metal atom, nickel, palladium or platinum. Examples of Group 10 metal compounds include, among others, nickel acetate, nickel acetylacetonate, nickel ethylhexanoate, nickel naphthenate, nickel trifluoroacetate, nickel trifluoroacetylacetonate, nickel hexafluoroacetylacetonate, nickel dibenzoylmethanate, nickel benzoylmethanate, nickel carboxylates, nickel cyclohexanebutyrate, nickel octanoate, nickel stearate, palladium acetate, palladium acetylacetonate, palladium ethylhexanoate, palladium propionate, palladium trifluoroacetate, palladium hexafluoroacetylacetonate, palladium carboxylates, and platinum acetylacetonate.

Suitable equivalents of the Group 10 metal compound are contacted with suitable equivalents of the halohydrocarbyl Grignard to facilitate formation of the Group 10 metal catalyst. In some embodiments in accordance with the present invention, the equivalents ratio of the halohydrocarbyl Grignard to the Group 10 metal compound is from 10:1 to 2:1. In other embodiments, the equivalents ratio of the halohydrocarbyl Grignard to the Group 10 metal compound is from 5:1 to 2:1, and in yet other embodiments, such ratio is from 3:1 to 2:1. It should be noted however, that other ratios of Grignard to Metal Compound, higher or lower, may also prove to be effective and are therefore within the scope of the instant application.

Since the aforementioned Group 10 metal catalyst is generally formed in a solvent suitable for the polymerization of norbornene-type monomers, advantageously this catalyst solution/suspension can be combined with a solution of monomers providing for the polymerization to be readily initiated. It should be understood that "combined" is inclusive of adding the aforementioned monomer solution to the catalyst solution or vice versa. Thus it can be said that catalyst solutions in accordance with the present invention are in situ catalysts.

The Group 10 metal compound is contacted with the halohydrocarbyl Grignard under suitable temperature to facilitate formation of the Group 10 metal catalyst. In one embodiment, the Group 10 metal compound is contacted with the halohydrocarbyl Grignard under a temperature from about −10° C. to about 85° C. In another embodiment, the Group 10 metal compound is contacted with the halohydrocarbyl Grignard under a temperature from about 0° C. to about 60° C. In yet another embodiment, the Group 10 metal compound is contacted with the halohydrocarbyl Grignard under a temperature from about 25° C. to about 45° C.

While the true nature of the Group 10 metal catalyst formed by the contacting of the Group 10 metal compound with the halohydrocarbyl Grignard is not known, the Inventors advance the following, non-binding and non-limiting observations.

Figure 3:
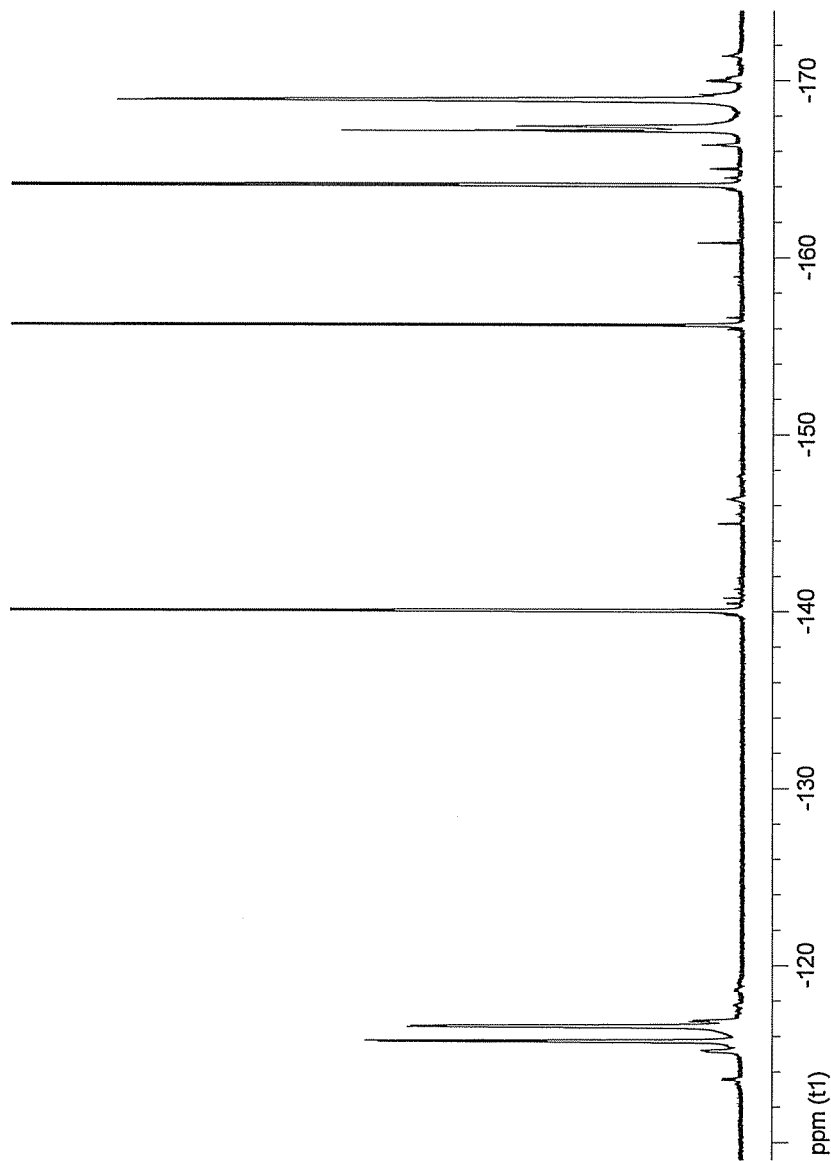
FIG. 3 shows a $^{19}F$ NMR spectrum of the Group 10 metal catalyst of Catalyst Example 1.

Referring now to FIG. 1, the $^{19}F$ NMR spectrum of a representative Ni catalyst in accordance with that which is disclosed in U.S. Pat. No. 6,136,499 (the '499 patent) is provided. While the inventors initially believed that embodiments in accordance with the present invention would provide such a catalyst, the $^{19}F$ NMR spectrum of FIG. 3 is indicative that such embodiments provide different species. Not wishing to be bound by any theory, it is believed that the Group 10 complexes in FIG. 3 are inclusive of fluorinated hydrocarbyl ligands.

As will be explained in greater detail below, the reaction of nickel(II) acetylacetonate and pentafluorophenyl Grignard yields at least four nickel pentafluorophenyl species referred to herein as A, B, C and T. It is believed that A contains at least one pentafluorophenyl ligand; B contains at least three pentafluorophenyl ligands of which two pentafluorophenyl ligands are chemically equivalent and distinct from the other pentafluorophenyl ligand; C is a bimetallic species with chloride bridging (μ-Cl) the two metal centers of Ni and Mg and with two pentafluorophenyl ligands coordinated with the Ni center; and T is a catalytically inactive species having a Ni center coordinated with four pentafluorophenyl ligands. Since the $^{19}F$ NMR resonances observed for Species A, B, C and T are distinct from those shown in FIGS. 1 and 2 for $(\eta^6\text{-toluene})Ni(C_6F_5)_2$ of the '499 patent, it is believed that species A, B, C and T are not nickel bis(pentafluorophenyl) fragments stabilized by solvent molecules such as toluene and thf as the '499 patent discloses.

Individual resonances in the $^{19}F$ NMR spectrum shown in FIG. 3 (Catalyst Example 1 below) can be assigned to individual species, A, B, C and T, through the use of different reaction conditions and isolation of Species C and T by crystallization. As the amount of a particular species in the in situ mixture changes, the magnitude of all the $^{19}F$ resonances associated with that species will change proportionally, allowing individual species to be identified.

Pentafluorobenzene, pentafluorobenzene derivatives, and pentafluorophenyl ligands of a metal center (collectively, pentafluorophenyl species) have at least three chemically distinct groups of fluorine atoms that produce at least three different resonance frequencies in an $^{19}F$ NMR spectrum. That is, one position of the aromatic pentafluorobenzene ring is substituted with an non-fluorine atom, group or ligand such that the fluorine atoms that are located meta, ortho, and para from the non-fluorine atom, group or ligand are chemically distinct fluorine atoms that can be differentiated by $^{19}F$ NMR, as shown in Formula I.

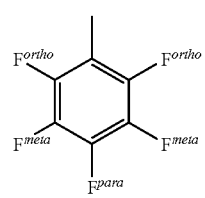

(I)

Figure 8:
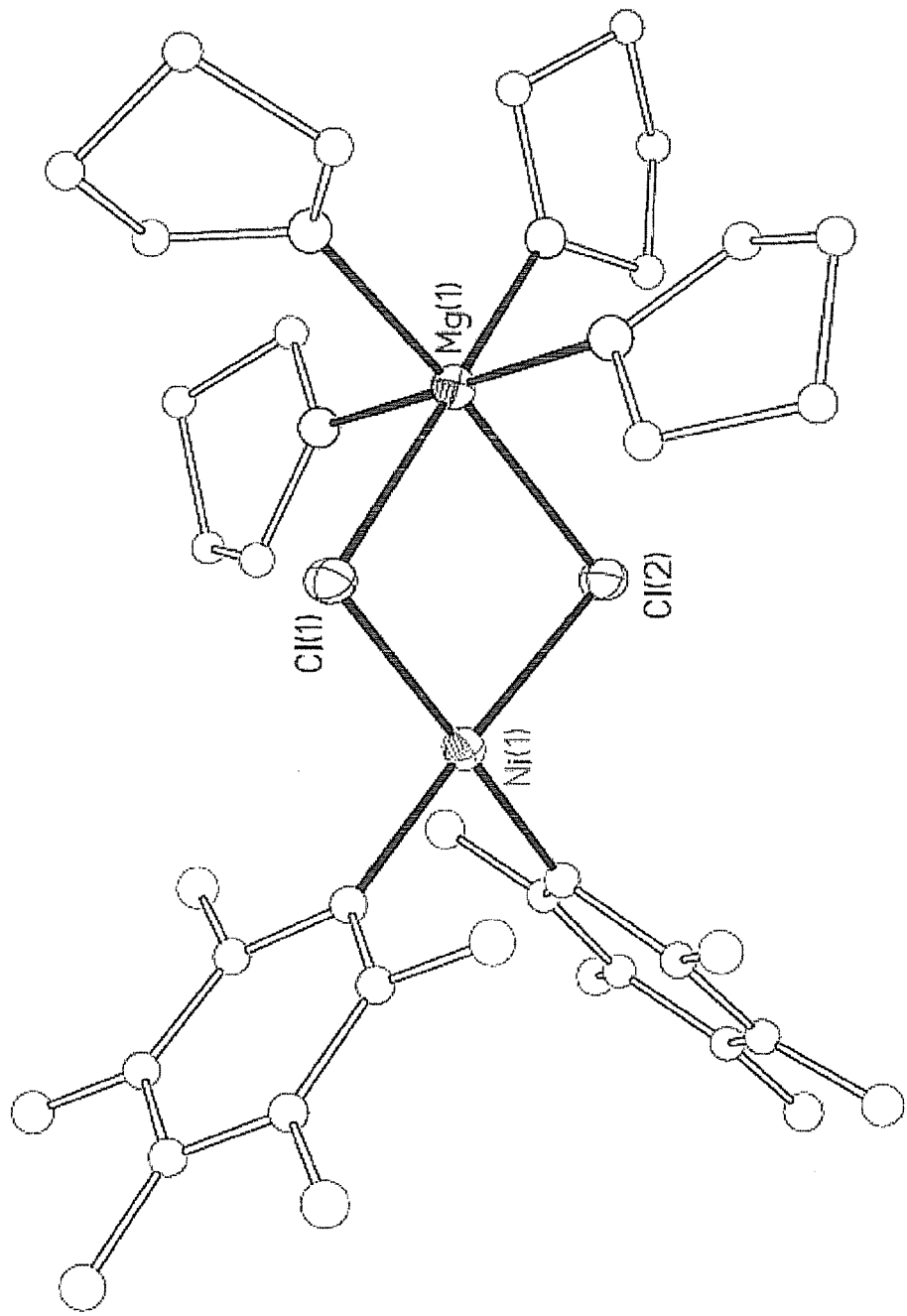
FIG. 8 shows a drawing of a molecular structure for Ni catalyst isolated from the Group 10 metal catalyst of Catalyst Example 6.
Figure 9:
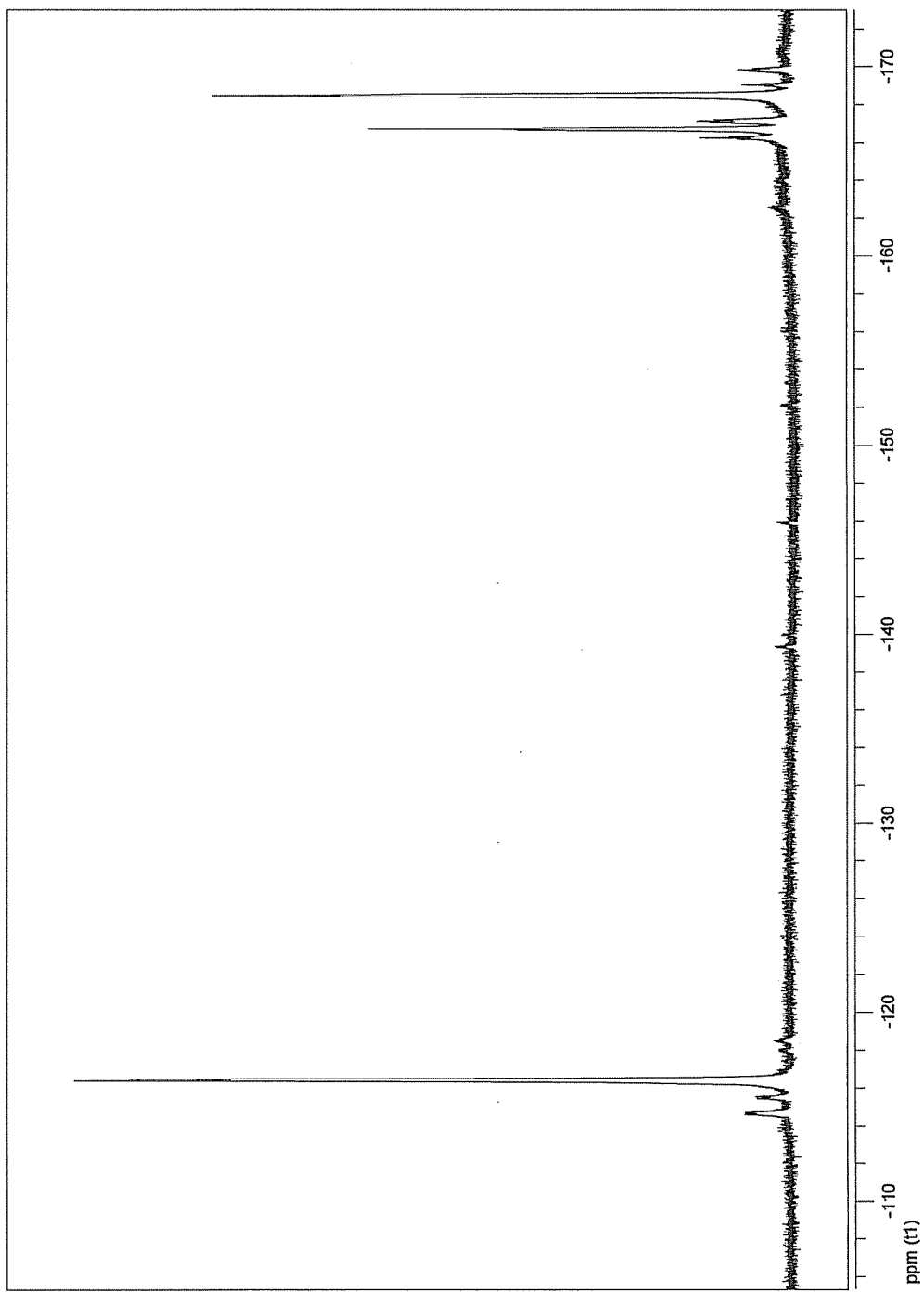
FIG. 9 depicts a $^{19}F$ NMR spectrum of a Group 10 metal catalyst made in the manner of Catalyst Example 6.

The identities of Species C and T are known and the crystal structures determined using standard X-ray diffraction techniques. Methods for obtaining crystals of Species C and T, respectively, are described in the methods below under the headings Catalyst Example 6 (Species C) and Catalyst Example 7 (Species T). A $^{19}F$ NMR was taken for the crystals plus surrounding mother liquor oil and for the crystals of Species C free from bulk oil. The crystal structure of Species C and its $^{19}F$ NMR spectrum are shown in FIGS. 8 and 9, respectively. The crystal structure reveals the identity of Species C as $[\{Ni(C_6F_5)_2(\mu\text{-}Cl)_2Mg(thf)_4\}]$. The Ni center is coordinated with two pentafluorophenyl groups with cis stereochemistry. The nickel center is linked to the magnesium center by two bridging chloro ligands (μ-Cl), while the balance of the octahedral coordination sphere of the magnesium center is occupied by four thf solvent molecules coordinated through the free electron pairs of the oxygen atom. Since catalysis is supported by the Group 10 metal center, the identities of the solvent molecules coordinated with Mg are not believed to be critical for catalytic activity. The resonances corresponding to Species C are identifiable by their increased intensity in the spectrum for the re-dissolved crystals free of bulk oil. The chemical shift for Species C resonances are given below in Catalyst Example 6; the presence of three identifiable resonances supports the pentafluorophenyl ligands being chemically equivalent in agreement with the crystal structure.

Figure 10:
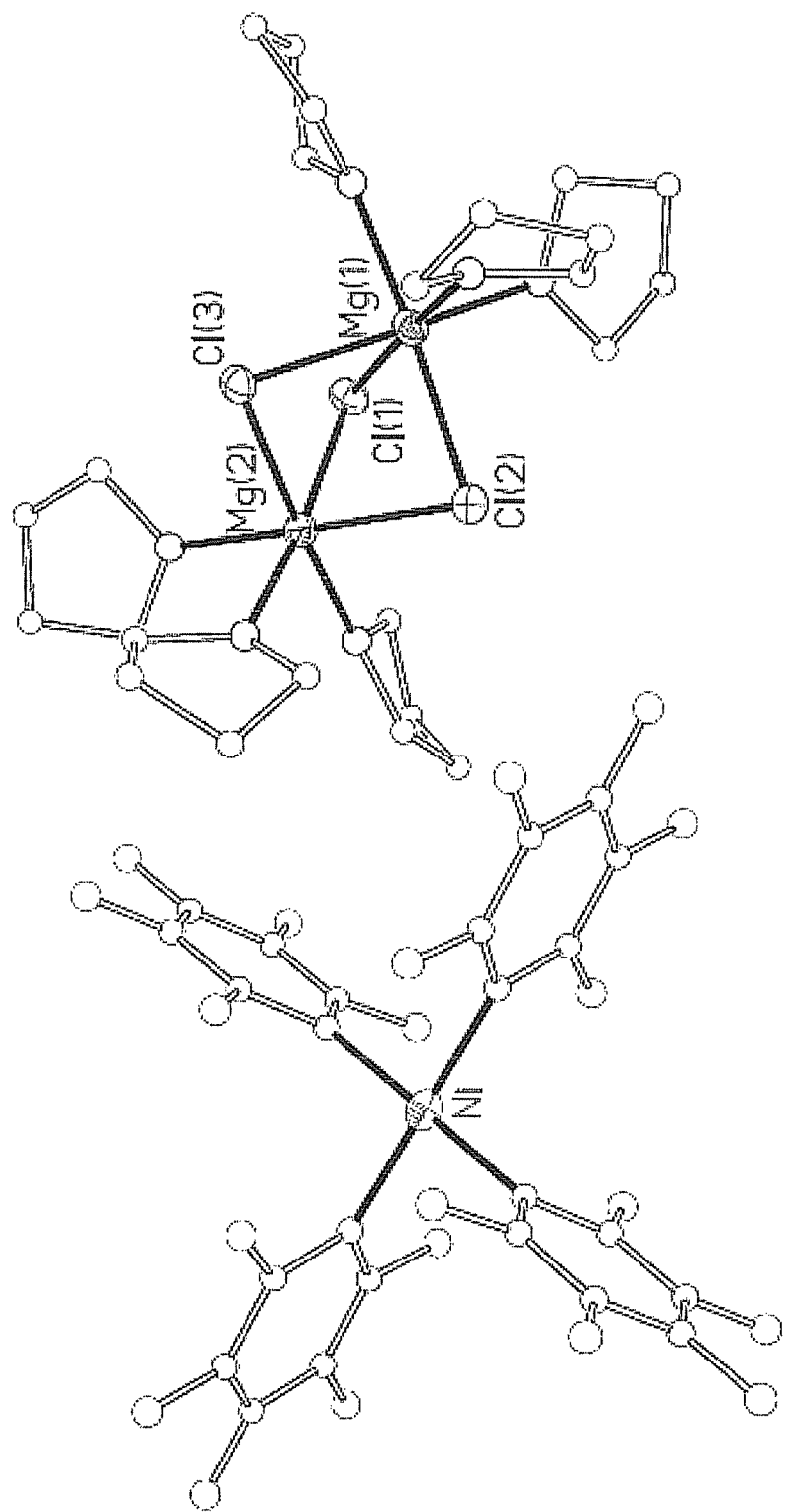
FIG. 10 shows a drawing of a molecular structure for inactive Ni species isolated from the Group 10 metal catalyst of Catalyst Example 7.
Figure 11:
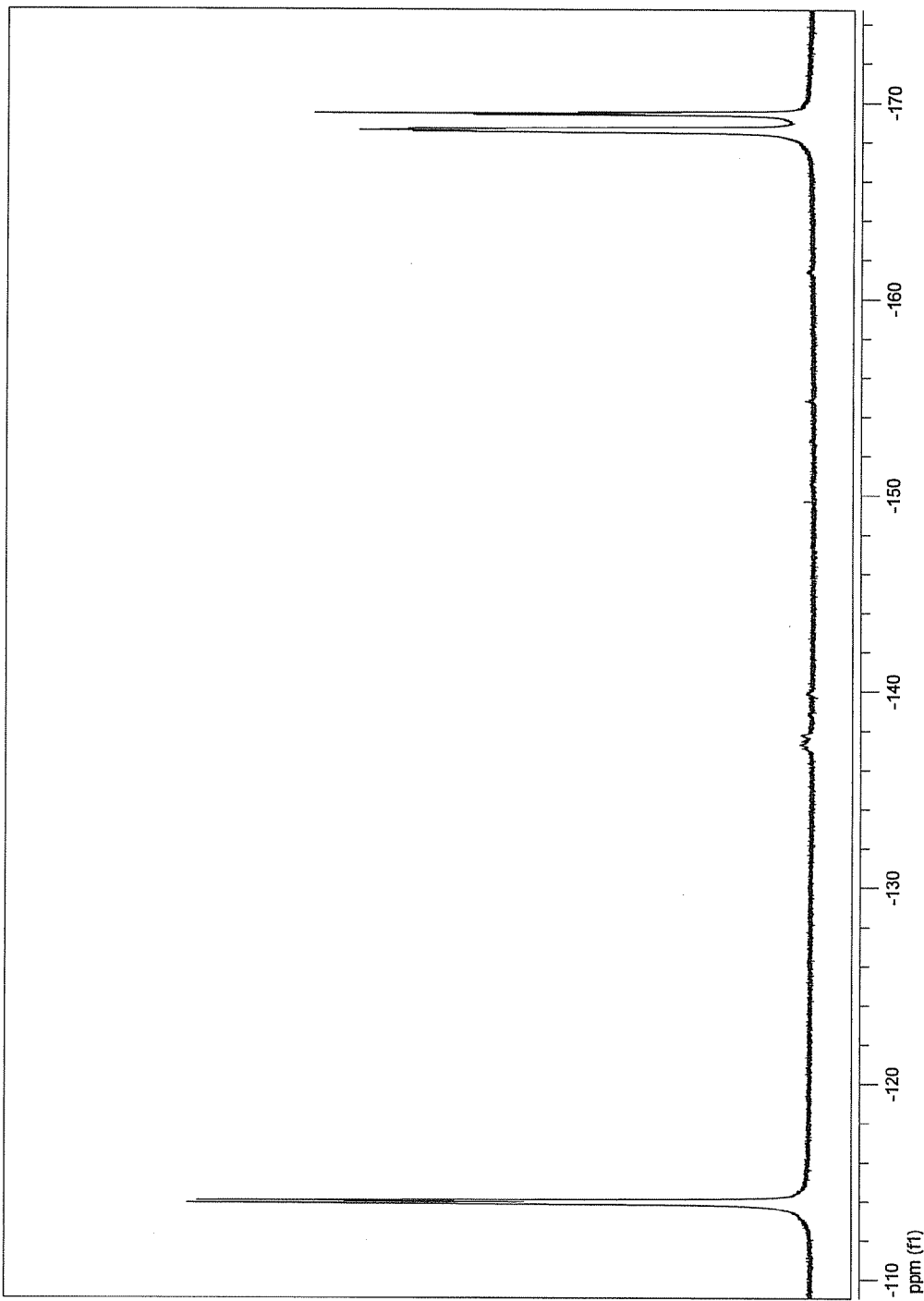
FIG. 11 depicts a $^{19}F$ NMR spectrum of an inactive Ni species isolated from the Group 10 metal catalyst of Catalyst Example 7.

Crystals of Species T were obtained as described in the methods below under the heading Catalyst Example 7. The crystals were used to determine a crystal structure using standard X-ray diffraction techniques. The crystals were re-dissolved and a $^{19}$F NMR spectrum was taken. The crystal structure for Species T and its $^{19}$F NMR spectrum are shown in FIGS. 10 and 11, respectively. The three resonances due to Species T in FIG. 11 are identifiable through an increased magnitude as compared to other spectra. For example, compare the spectrum of FIG. 11 to that of FIG. 3 or 4 where the abundance of Species T was not enriched by crystallization. The crystal structure reveals the identity of Species T as [Ni(C$_6$F$_5$)$_4$][(thf)$_3$Mg($\mu$-Cl)$_3$Mg(thf)$_3$]$_2$. The anion of Species T is a divalent anion having four pentafluorophenyl ligands coordinated to a Ni center and the monovalent cation is a homobimetallic species having 3 bridging chloro ligands and three thf solvent ligands associated with each Mg center.

Those skilled in the art will readily understand that Species C is a specific embodiment formed when $^i$PrMgCl, C$_6$F$_5$Br and Ni(acac)$_2$ are employed to form an in situ Group 10 metal catalyst, and that other species can be formed by using different combination of reactants thus these other species are within the scope of the present invention. A genus of heterobimetallic complexes having M and Mg metal or metal ion centers with bridging halogen ligands is shown in Formula II below. Complexes having the structure of Formula II are believed to be sufficient to support catalysis and are readily synthesized using the methods described herein.

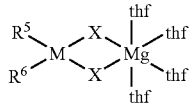

(II)

In Formula II, M represents a Group 10 metal in the 2+ oxidation state to form a square planar Group 10 metal center; Group 10 metals include Ni, Pd and Pt. The X represents Cl, Br or I. The R$^5$ and R$^6$ ligands, independently, represent a halohydrocarbyl ligand originating from the halohydrocarbyl Grignard used in the synthesis of the Group 10 metal catalysts. Generally such ligands encompass halohydrocarbyls such as halophenyls, haloalkysubstituted halophenyls, halomethylphenyls, and haloalkyl ligands including branched haloalkyl ligands (e.g. haloalkyl substituted methyl). In some embodiments such halohydrocarbyl ligands include pentafluorophenyl, di-trifluoromethylphenyl, trifluoromethylphenyl, difluorophenyl, trifluorophenyl, tetrafluorophenyl, 2,4,6-trifluoro-3,5-dichlorophenyl, 3,5-di-trifluoromethylphenyl, 2,4,6-tri-trifluoromethylphenyl, di-trifluoromethyl-fluoro-chloromethyl, trichlorophenyl, tetrachlorophenyl, and pentachlorophenyl. In other embodiments, R$^5$ and R$^6$ are each independently selected from trifluorophenyl, tetrafluorophenyl, pentafluorophenyl, trichlorophenyl, tetrachlorophenyl, and pentachlorophenyl.

While the structures for Species A and B has not yet been determined, and not wishing to be bound by theory, the NMR spectra of Species A and B and supporting information from the known structures of Species C and T allow for only a few limited possibilities for the identities of Species A and B. Specifically, the chemical shifts observed (see Catalyst Example 1) are highly consistent with one or more pentafluorophenyl ligands coordinated with a Ni center. The $^{19}$F resonances for various known pentafluorophenyl Ni complexes are shown below in Table 1.

TABLE 1

$^{19}$F Resonances for Select Pentafluorophenyl Ni species

| Ni Species | ortho | para | meta |
|---|---|---|---|
| [NBu$_4$]$_2$[Ni(C$_6$F$_5$)$_4$][1] | −114.3 | −169.3 | −168.7 |
| [NBu$_4$]$_2$[{Ni(C$_6$F$_5$)$_2$}($\mu$-Cl)$_2$][1] | −116.6 | −165.2 | −167.5 |
| [PPh$_3$Me]$_2$[{Ni(C$_6$F$_5$)$_2$}($\mu$-Br)$_2$][1] | −116.2 | −164.7 | −166.7 |
| [PPh$_3$Me]$_2$[{Ni(C$_6$F$_5$)$_2$}($\mu$-I)$_2$][2] | −113.4 | −164.0 | −165.3 |
| [Ni(C$_6$F$_5$)$_2$(toluene)][3] | −113.7 | −159.2 | −163.5 |
| [Ni(C$_6$F$_5$)$_2$(thf)$_2$][3] | −118.8 | −160.5 | −164.6 |
| [Ni(C$_6$F$_5$)$_2$(DME)][3] | −118.6 | −160.9 | −165.3 |
| [Ni(C$_6$F$_5$)$_2$(EtOAc)$_2$][3] | 119.6 | −162.3 | −166.2 |
| [Ni(C$_6$F$_5$)$_2$(dioxane)$_2$][3] | −119.1 | −160.7 | −164.9 |

[1]CDCl$_3$,
[2]CD$_2$Cl$_2$,
[3]d$_8$-toluene

The $^{19}$F resonances for Species A and B are highly indicative of a Group 10 metal complex having at least two pentafluorophenyl ligands with cis stereochemistry in view of the known structures of Species C and T formed by the reaction of a halohydrocarbyl Grignard with a Group 10 metal compound. All species formed by reaction of a halohydrocarbyl Grignard with a Group 10 metal compound, in accordance with the innovations disclosed herein, form a Group 10 metal complex having square planar coordination geometry and two halohydrocarbyl ligands having cis stereochemistry coordinated with a Group 10 metal, the halohydrocarbyl ligands independently selected from the group encompassing, among others, halophenyls, haloalkylsubstituted halophenyls, halomethylphenyls, and haloalkyl ligands including branched haloalkyl ligands such as haloalkyl substituted methyl, with the proviso that any Group 10 metal in the Group 10 metal complex is not coordinated with thf. Thus, the two halohydrocarbyl ligands have cis stereochemistry and are independently selected from the same group of halohydrocarbyls disclosed for Formula II, above.

In one embodiment, the Group 10 metal complex having square planar coordination geometry has a third halohydrocarbyl ligand coordinated with a Group 10 metal, where the third halohydrocarbyl ligand is independently selected from any of the groups defined above. The remaining one or two ligands coordinated to a Group 10 metal in the Group 10 metal complex having square planar geometry are selected from the group encompassing, among others, halo ligands, ligands having one or more oxygen atoms coordinated with the Group 10 metal, bridging halo ligands coordinated with the Group 10 metal and a second metal center in the Group 10 metal complex, and bridging ligands having one or more oxygen atoms coordinated with the Group 10 metal and a second metal center in the Group 10 metal complex. Exemplary ligands having one or more oxygen atoms include acetate, acetylacetonate, trifluoroacetylacetonate, ethylhexanoate, naphthenate, trifluoroacetate, hexafluoroacetylacetonate, cyclohexanebutyrate, propionate, octanoate, stearate, tetramethylheptanedionate, dibenzoylmethanate, benzoylacetonate as well as ligands having carboxylic functionality. In one embodiment, the second metal center is magnesium.

Since Species B exhibits six distinct $^{19}$F resonances, Species B has at least 2 chemically non-equivalent pentafluorophenyl ligands. However, the ortho fluorine resonance assigned to a shift of −114.4 ppm is almost exactly half of the integrated intensity of the ortho fluorine resonance assigned to a shift of −116.1 ppm, for example, see FIGS. 3 and 4. A similar observation holds for the $^{19}$F resonances assigned to meta and para fluorine atoms for Species B. Therefore, Species B has three pentafluorophenyl ligands associated with a Ni center with two of the pentafluorophenyl ligands being chemically equivalent.

Those skilled in the art will readily recognize that Species B is a specific embodiment formed when $^{i}$PrMgC$_1$, C$_6$F$_5$Br, and Ni(acac)$_2$ are employed in synthesis. Species B belongs to a genus having a Group 10 metal center anion of the formula [MR$^7$R$^8$R$^9$L], as shown in Formula III below. L is a solvent ligand such as thf, a halo ligand such as Cl or Br, and/or the counter anion originating from the Group 10 metal compound used in synthesis selected from one or more from exemplary group of ligands provided above. The R$^7$, R$^8$, and R$^9$ ligands, independently, represents a halohydrocarbyl ligand as defined above.

In Formula III, M represents a Group 10 metal in the 2+ oxidation state to form a square planar Group 10 metal center; Group 10 metals include Ni, Pd and Pt. In one embodiment, the R$^7$, R$^8$ and R$^9$ ligands are, independently, selected from the group encompasing halophenyls, haloalkysubstituted halophenyls, halomethylphenyls, haloalkyl ligands including branched haloalkyl ligands such as haloalkyl substituted methyl. Specific examples of a halohydrocarbyl ligand include, among others, pentafluorophenyl, di-trifluorometh-ylphenyl, trifluoromethylphenyl, difluorophenyl, trifluorophenyl, tetrafluorophenyl, 2,4,6-trifluoro-3,5-dichlorophenyl, di-trifluoromethylfluorophenyl. In another embodiment, R$^7$, R$^8$ and R$^9$ are one or more independently selected from the group encompasing trifluorophenyl, tetrafluorophenyl, pentafluorophenyl, trichlorophenyl, tetrachlorophenyl, and pentachlorophenyl. In yet another embodiment, R$^7$, R$^8$ and R$^9$ are pentafluorophenyl. The variables p and q depend upon the overall valent charge of the Group 10 metal-containing complex and the counter cation complex in Formula III. In one embodiment, the variables p and q are, independently, 1 or 2. In another embodiment, the value of the sum of the variables p and q (p+q) is 2 or 3.

Z is a counter cation to the Group 10 metal-containing complex anion shown in Formula III or a cation-containing group coordinated with ligand L shown in Formula III. The precise identity of Z is not believed to be critical for catalysis; typically Z has a valent or formal charge of 1+ or 2+. In one embodiment, Z is one or more selected from the group encompassing, among others, a solvated Mg cation, Mg cation complex, or a Mg cation coordinated with ligand L of Formula III, when L is a non-solvent ligand suitable for bridging two metal centers. According to P. Sobota (*Pure & Appl. Chem.*, 1989, vol. 61, n. 5, 861), it is feasible for a Mg cation to serve as the counter cation Z since it is feasible for Mg$^{2+}$ to be solvated with thf and possibly other solvents without the need for any non-solvent ligands coordinated with Mg. Z can also be a cation complex such as the [(thf)$_3$Mg(μ-Cl)$_3$Mg(thf)$_3$]$^+$ complex that serves as a counter cation in Species T. Z can also be coordinated with ligand L in Formula III to form a single heterobimetallic or heteromultimetallic complex including a Group 10 metal center and at least one magnesium metal center, where the remaining positions in the octahedral coordination sphere of the at least one magnesium metal center can be occupied ligands having the same possible identities as L in Formula III, as defined above. The Group 10-containing metal anion complex and the Z cation have a stoichiometry, variables p and q, to form an electrically neutral complex.

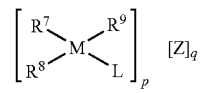

(III)

The solved crystal structure of Species C and the similarity in $^{19}$F NMR spectra between Species A and C are highly suggestive of Species A also having a cis-bis(pentafluorophenyl) Group 10 center, where the remaining two ligands of the Group 10 metal center are arranged such that the pentafluorophenyl ligands are chemically equivalent. Specifically, a $^{19}$F NMR spectrum consistent with Species A requires the remaining positions in the Group 10 metal square planar complex to be chemically identical.

Those skilled in the art will readily recognize that Species A is a specific embodiment formed when $^{i}$PrMgC$_1$, C$_6$F$_5$Br, and Ni(acac)$_2$ are employed in synthesis. Species A belongs to a genus encompassing a Group 10 metal center of Formulae IV and V below. The genus including species A is characterized by a Group 10 metal center with two cis hydrocarbyl ligands, as defined above, and the Group 10 metal center coordinated to two oxygen atoms on one or more ligands or two bromo ligands in a cis fashion. One possible structure for the genus of Species A is a species identical to the genus of Species C (Formula II) except the bridging chloro ligands (μ-Cl) are replaced with bridging bromo ligands (μ-Br). Alternatively as shown in Formula V, the genus of Species A can include a bidentate ligand having two oxygen atoms, represented by two oxygen atoms connected by a curved line, or the genus of Species A can include two ligands having at least two oxygen atoms, where one oxygen atom is bound to each metal center in a monodentate fashion to bridge between the Group 10 metal center and the magnesium metal center. Ligands having two or more oxygen atoms as represented in Formulae IV and V are selected from the group encompassing, among others, acetylacetonate, ethylhexanoate, naphthenate, acetate, trifluoroacetate, hexafluoroacetylacetonate, cyclohexanebutyrate, octanoate, and propionate, including ligands having carboxylate functionality.

In Formulae IV-V, M represents a Group 10 metal in the 2+ oxidation state to form a square planar Group 10 metal center; Group 10 metals include Ni, Pd and Pt. The R$^{10}$ and R$^{11}$ ligands are selected from the group of halohydrocarbyls defined above for Formula II. In some embodiments R$^{10}$ and R$^{11}$ are each independently selected from the group encompassing trifluorophenyl, tetrafluorophenyl, pentafluorophenyl, trichlorophenyl, tetrachlorophenyl, and pentachlorophenyl pentafluorophenyl, trichlorophenyl, tetrachlorophenyl, and pentachlorophenyl. In other embodiments, R$^{10}$ and R$^{11}$ are pentafluorophenyl. In Formula IV, Z has the same definition as for Formula III. In one embodiment, the variables s and r are, independently, 1 or 2. In another embodiment, the value of the sum of the variables s and r (s+r) is 2 or 3.

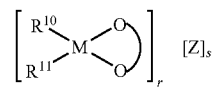

(IV)

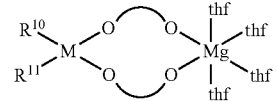

(V)

The relative amount of Species A, B, C and T formed is highly dependent upon the reaction conditions used. As illustrated in the methods below, a halohydrocarbyl Grignard compound is formed in a solution and then added to a Group 10 metal compound. The Grignard solution is formed by combining a first amount of a hydrocarbyl magnesium halide and a second amount of a halohydrocarbyl compound. When the resulting halohydrocarbyl Grignard solution is then added to a solid Group 10 metal compound, the resulting reaction products are generally Species A and Species C, as seen in Catalyst Example 1. The amount of species T can be increased by adding the halohydrocarbyl Grignard solution to a suspension of Group 1.0 metal compound in cyclohexane, as shown in Catalyst Examples 2 through 4. The amount of Species B can be increased by adding the halohydrocarbyl Grignard solution to a solution of Group 10 metal compound in tetrahydrofuran.

Polyolefins including polycyclic polymers can be synthesized by contacting one or more of Species A, Species B, and Species C with an olefin monomer(s). In one embodiment, the molar ratio of total olefin monomer to any individual Group 10 metal catalyst species (Species A, Species B, or Species C) is independently from 20:1 to 10,000:1, preferably 50:1 to 5,000:1, and most preferably 100:1 to 1,000:1. In another embodiment, the molar ratio of total olefin monomer to Group 10 metal contained in any of the described Group 10 metal catalyst species (Species A, Species B, and Species C) is from 20:1 to 10,000:1, preferably 50:1 to 5,000:1, and most preferably 100:1 to 1,000:1.

The Group 10 metal catalysts described herein are suitable for the preparation of a wide range of polymers having cyclic repeating units. The polymers having cyclic repeating units can be prepared by the addition polymerization of a polycycloolefin monomer(s) in the presence of a catalytic amount of the Group 10 metal catalyst described herein. While the polymers made using the Group 10 metal catalyst have cyclic repeating units, the polymers have cyclic repeating units can contain, but are not limited to, two or more types of cyclic repeating units, three or more types of cyclic repeating units, and four or more types of cyclic repeating units.

The monomers are polymerized in solution. Typically the Group 10 metal catalyst is added to the reaction medium containing the desired monomer(s), however, it is believed that addition of the monomers to the Group 10 metal catalyst would also be effective. The polymers prepared using the Group 10 metal catalyst are addition polymers of polycycloolefinic repeating units linked through 2,3-enchainment. The repeating units are polymerized from a polycycloolefin monomer or combination of polycycloolefin monomers that contain at least one norbornene-type moiety as described herein.

The polymerization reaction can be carried out by adding a solution of the Group 10 metal catalyst to a solution of the cycloolefin monomer or mixtures of monomers to be polymerized. The amount of monomer in solvent ranges from 5 to 75% weight. In another embodiment, the amount of monomer in solvent ranges from 10 to 50% weight. After the Group 10 metal catalyst solution and the monomer solution are in contact, the reaction medium is agitated to ensure complete mixing of Group 10 metal catalyst and monomer components. Solvents for the polymerization reaction include any of those listed to host the Group 10 metal catalyst and/or Group 10 metal catalyst reactants (one or more of alkane and cycloalkane solvents such as pentane, hexane, heptane, cyclohexane, 2,2,4-trimethylpentane (ISOPAR C), octane; ethers such as thf, di-n-butyl ether, MeTHF, methyl-t-butyl ether, dialkyl glycol ethers, and diethylether; aromatic solvents such as benzene, xylene, toluene, p-cymene, naphthalene, mesitylene, tetralin, fluorobenzene, o-difluorobenzene, p-difluorobenzene, trifluorotolune and hexafluorobenzene); as well as nonpolar organic solvents such as aromatic hydrocarbons, esters such as ethyl acetate and i-amyl acetate, and ketones such as MEK or MAK, and any mixture of the preceding solvents. In one embodiment, the polymerization solvent is not water or a polar hydroxyl containing compound.

The ratio of monomer to catalyst is determined by the ratio of number of moles of monomer to the number of moles of the catalyst precursor, i.e., the transition metal complex that is reacted with the halohydrocarbyl Grignard.

The polymerization reaction temperatures (regardless of the specific type of polymerization) are suitable to yield the desired polymer. In one embodiment, the polymerization reaction temperature is from 0° C. to 100° C. In another embodiment, the polymerization reaction temperature is from 30° C. to 80° C. In yet another embodiment, the polymerization reaction temperature is from 40° C. to 70° C.

The polymerization reaction time (regardless of the specific type of polymerization) is suitable to yield the desired polymer. In one embodiment, the Group 10 metal catalysts and monomer(s) are contacted for a time from about 1 minute to about 20 hours. In another embodiment, the Group 10 metal catalysts and monomer(s) are contacted for a time from about 10 minutes to about 10 hours. In yet another embodiment, the Group 10 metal catalysts and monomer(s) are contacted for a time from about 20 minutes to about 4 hours.

The polymers produced by embodiments in accordance with the present invention are useful in electronic, microelectronic, optoelectronic and optical applications. In electronic and microelectronic applications, uses include sacrificial layers/structures, dielectric films (i.e., multichip modules and flexible circuits), chip attach and chip stacking adhesives, underfill adhesives, chip encapsulants, glob tops, near hermetic board and chip protective coatings, embedded passives, laminating adhesives, capacitor dielectrics, high frequency insulator/connectors, high voltage insulators, high temperature wire coatings, conductive adhesives, reworkable or removable adhesives useful for temporary wafer or chip bonding, photosensitive adhesives and dielectric films, resistors, photoresists, inductors, capacitors, antennas and printed circuit board substrates. In optical applications uses include optical films, ophthalmic lenses, wave guides, optical fibers, photosensitive optical film, specialty lenses, windows, high refractive index film, laser optics, color filters, optical adhesives, optical connectors and in the fabrication of optoelectronic imaging and sensing devices.

EXAMPLES

Other than in the operating examples or where otherwise indicated, all numbers, values and/or expressions referring to quantities of ingredients and reaction conditions used in the specification and claims are reflective of the various uncertainties encountered in obtaining such numbers, values and/or expressions and are therefore to be understood as modified in all instances by the term "about." Further, where a numerical range is disclosed herein, unless otherwise indicated, such range is continuous and encompasses its minimum and maximum values as well as every value therebetween. In addition, it will be understood, that where more than one range is provided to describe a given characteristic, a value from a first such range can be combined with a value from a second such range to create a new range providing an alternative description of the given characteristic.

The following examples are provided for illustrative purposes only and are not intended to limit the invention in any way. Unless otherwise indicated, in the following examples and claims, all parts and percentages are by weight, all temperatures are in degrees Celsius (° C.), pressure is at or near atmospheric pressure and reaction conditions and materials are anhydrous. In addition, solvents used in the experiments below are essentially oxygen free. That is to say, that either the reagents and solvents mentioned are purchased as being essentially oxygen free or are charged into a reaction vessel and then sparged with nitrogen for a period of time believed sufficient to remove essentially all dissolved oxygen, or such reagents and solvents are individually sparged prior to their use and stored under a nitrogen blanket until they are charged to the reaction vessel. Therefore it will be understood that while a specific experimental description will not refer to either of the above methods of providing oxygen free reagents and solvents, one or the other was employed. Also, unless specifically noted otherwise, the molecular weight (Mw) of any polymer formed was determined by gel permeation chromatography (GPC) using poly(styrene) standards and percent (%) conversion/yield was also determined by GPC unless otherwise specified. In addition, the concentration of $^i$PrMgCl was 2.0M in THF, the concentration of $^i$PrMgBr was 1.0M in THF, and the concentration of EtMgBr was 1.0M in THF. In analyzing the $^{19}$F NMR of the Group 10 catalyst mixtures $^{19}$F resonances were only considered when they integrated at about 1% or higher compared to all resonances.

Comparative Catalyst Example 1

A solution of ($\eta^6$-toluene)Ni($C_6F_5$)$_2$ (Brezinski and Klabunde in Organometallics 1983, 2, 1116) was prepared in the same solvent mixture as Catalyst Example 8 (toluene/thf). The $^{19}$F NMR of this solution was run after mixing 0.6 ml of the nickel solution with 0.2 ml of $d_8$-thf. One nickel pentafluorophenyl species was observed: −118.4 (ortho-F, 2F), −162.5 (para-F, F), −166.0 (meta-F, 2F). The $^{19}$F NMR spectrum is shown in FIG. 1.

Comparative Catalyst Example 2

Figure 2:
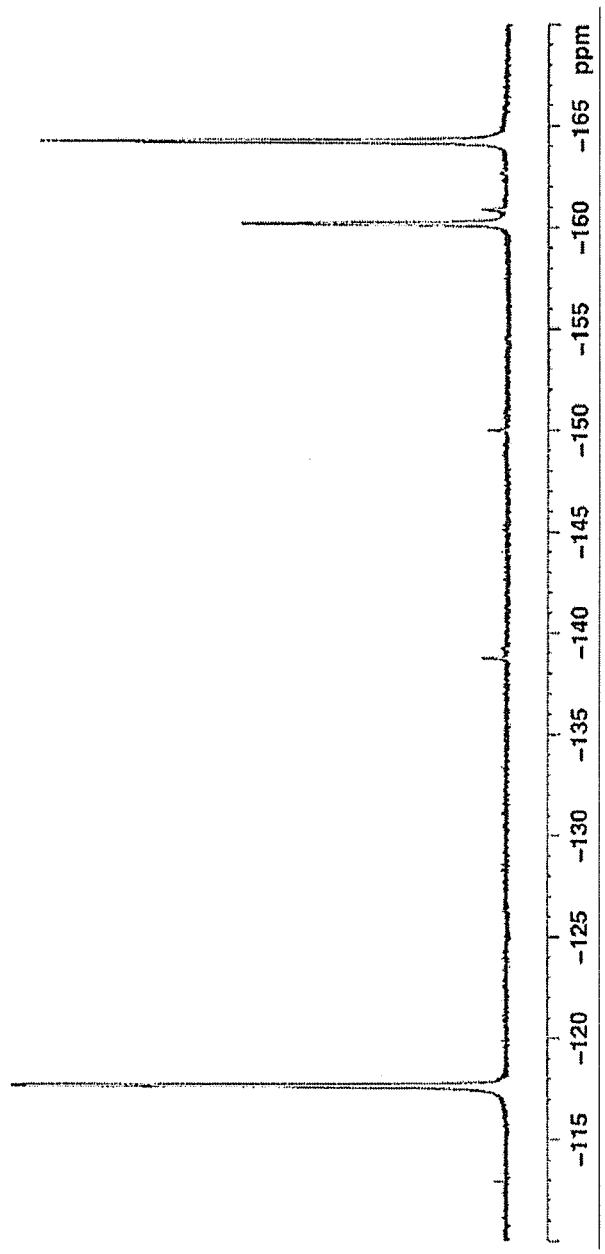
FIG. 2 shows a $^{19}F$ NMR spectrum of $(\eta^6\text{-toluene})Ni(C_6F_5)_2$ in the same solvent mixture as Catalyst Example 1 (cyclohexane/EtOAc/thf) as described in Comparative Example 2.

A solution of ($\eta^6$-toluene)Ni($C_6F_5$)$_2$ was prepared in the same solvent mixture as Catalyst Example 1 (cyclohexane/EtOAc/thf). The $^{19}$F NMR spectrum of this solution was taken after mixing 0.6 ml of the Ni solution with 0.2 ml of $d_8$-thf. One species was observed: 116.9 (ortho-F, 2F), −160.2 (para-F, F), −164.1 (meta-F, 2F). The $^{19}$F NMR spectrum is shown in FIG. 2.

Catalyst Example 1

$^i$PrMgCl (0.38 ml, 0.76 mmol) was diluted in cyclohexane (0.38 ml). Then $C_6F_5Br$ (188.0 mg, 0.76 mmol) was added dropwise to the $^i$PrMgCl solution at room temperature, to give a clear yellow solution. This yellow solution was added dropwise to the [Ni(acac)$_2$] (59.1 mg, 0.23 mmol) at room temperature and the resulting mixture was diluted with sufficient EtOAc to bring the mixture's concentration, based on Ni, to 0.2M. The $^{19}$F NMR spectrum of this solution was taken after mixing 0.6 ml of the nickel solution with 0.2 ml of $d_8$-thf. Four different nickel pentafluorophenyl species were observed (along with $C_6F_5H$ formed as a side product from reaction of the pentafluorophenyl Grignard with portico impurities such as water or acid): Species A: −115.4 (ortho-F, 2F), −165.7 (para-F, F), −168.4 (meta-F, 2F); Species B: −114.4 (ortho-F, 2F), −116.1 (ortho-F, 4F), −168.1 (para-F, 1F), −169.0 (para-F, 2F), −165.2 (meta-F, 2F), −166.0 (meta-F, 4F). Species C: −116.2 (ortho-F, 2F), −167.4 (para-F, F), −168.8 (meta-F, 2F); Species T: −113.9 (ortho-F, 2F), −170.8 (para-F, F), −169.8 (meta-F, 2F). The $^{19}$F NMR spectrum is shown in FIG. 3. The integral ratio of the Species A, B, C & T was 41%, 5%, 53% & 1% respectively.

Catalyst Example 2

Figure 4:
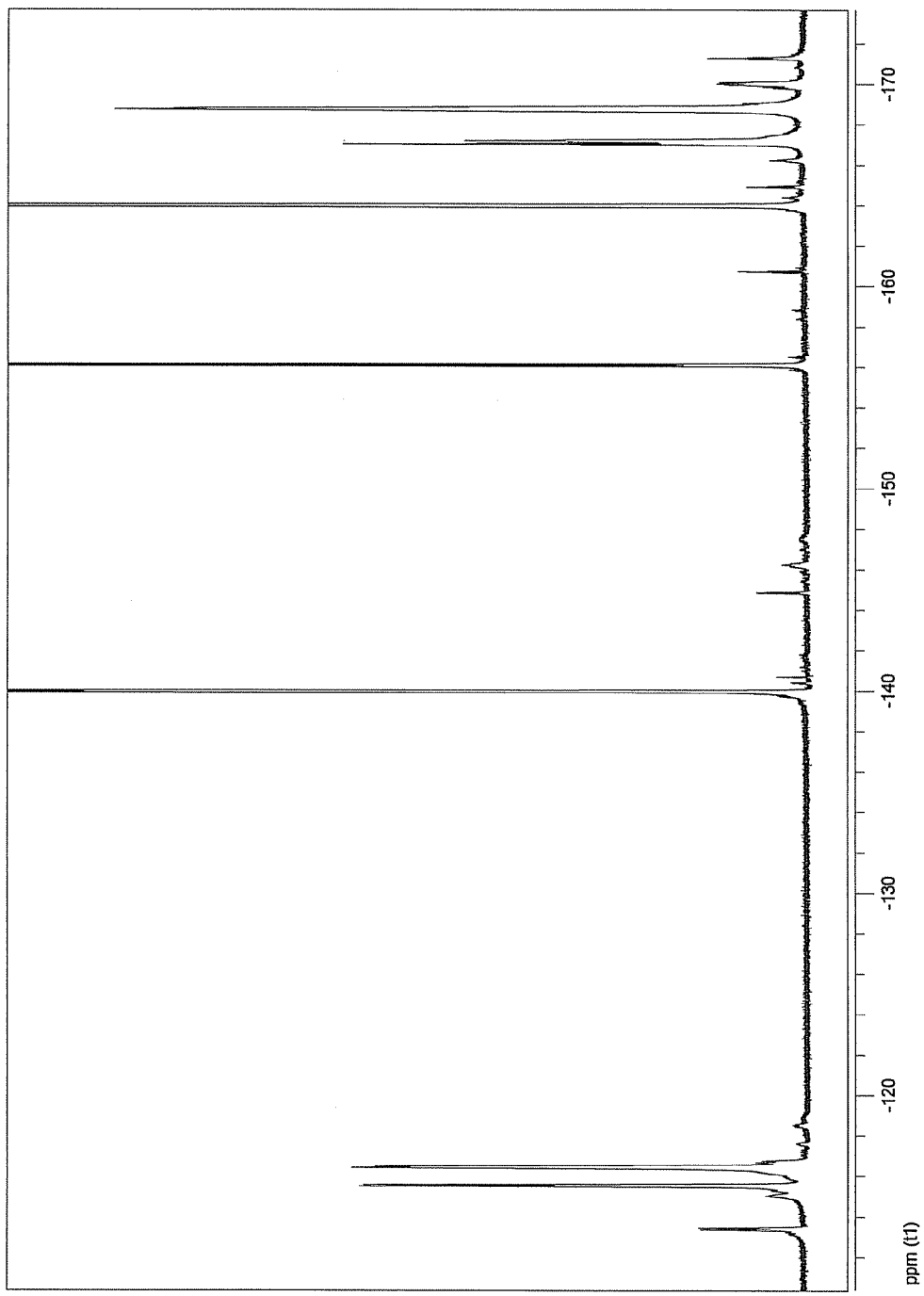
FIG. 4 depicts a $^{19}F$ NMR spectrum of a Group 10 metal catalyst made in the manner of Catalyst Example 2.

$C_6F_5Br$ (7.11 g, 28.8 mmol) was added dropwise to the $^i$PrMgCl (14.4 ml, 28.8 mmol) at 0° C. Then this solution was diluted with cyclohexane (3 ml) to give a clear yellow solution. This yellow solution was added dropwise to a [Ni(acac)$_2$] (2.12 g, 8.25 mmol) suspension in cyclohexane (5 ml) at 0° C. and the resulting mixture was diluted with sufficient EtOAc to bring the mixture's concentration, based on Ni, to 0.2M. The $^{19}$F NMR spectrum of this mixture was taken after mixing 0.6 ml of the diluted mixture with 0.2 ml of $d_8$-thf. Four different nickel pentafluorophenyl species were observed (along with $C_6F_5H$ formed as a side product from reaction of the pentafluorophenyl Grignard with portico impurities such as water or acid): Species A: −115.4 (ortho-F, 2F), −165.7 (para-F, F), −168.4 (meta-F, 2F); Species B: −114.4 (ortho-F, 2F), −116.1 (ortho-F, 4F), −168.1 (para-F, 1F), −169.0 (para-F, 2F), −165.2 (meta-F, 2F), −166.0 (meta-F, 4F); Species C: −116.2 (ortho-F, 2F), −167.4 (para-F, F), −168.8 (meta-F, 2F); Species T: −113.9 (ortho-F, 2F), −170.8 (para-F, F), −169.8 (meta-F, 2F). The $^{19}$F NMR spectrum is shown in FIG. 4. The integral ratio of the Species A, B, C & T was 38%, 7%, 47% & 8% respectively.

Catalyst Example 3

Figure 5:
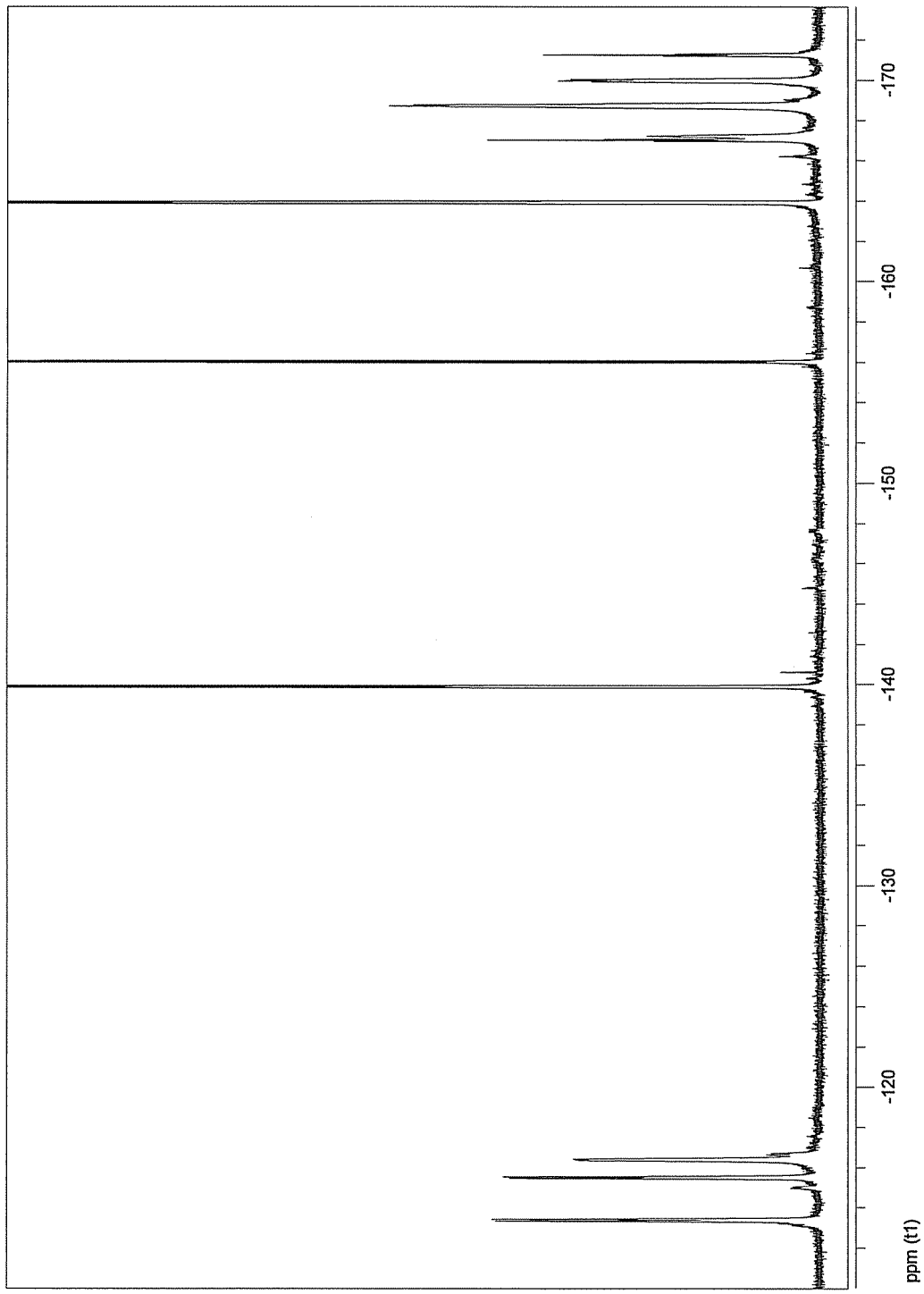
FIG. 5 depicts a $^{19}F$ NMR spectrum of a Group 10 metal catalyst made in the manner of Catalyst Example 3.

$^i$PrMgCl in thf (0.50 ml, 1.0 mmol) was added dropwise added to the $C_6F_5Br$ (248.0 mg, 1.0 mmol) at room temperature, to give a clear yellow solution. This yellow solution was added dropwise to a suspension of [Ni(acac)$_2$] (73.4 mg, 0.29 mmol) in cyclohexane (0.50 ml) at room temperature. The resulting oily solution was diluted with sufficient EtOAc to bring the mixture's concentration, based on Ni, to 0.2M. The $^{19}$F NMR spectrum of this solution was taken after mixing 0.6 ml of the diluted mixture with 0.2 ml of $d_8$-thf. Four different nickel pentafluorophenyl species were observed (along with $C_6F_5H$ formed as a side product from reaction of the pentafluorophenyl Grignard with portico impurities such as water or acid): Species A: −115.4 (ortho-F, 2F), −165.7 (para-F, F), −168.4 (meta-F, 2F); Species B: −114.4 (ortho-F, 2F), −116.1 (ortho-F, 4F), −168.1 (para-F, 1F), −169.0 (para-F, 2F), −165.2 (meta-F, 2F), −166.0 (meta-F, 4F); Species C: −116.2 (ortho-F, 2F), −167.4 (para-F, F), −168.8 (meta-F, 2F); Species T: −113.9 (ortho-F, 2F), −170.8 (para-F, F), −169.8 (meta-F, 2F). The $^{19}$F NMR spectrum is shown in FIG. 5. The integral ratio of the Species A, B, C & T was 33%, 5%, 29% & 33% respectively.

Catalyst Example 4

Same as Catalyst Example 3 except the $C_6F_5Br$ (248.0 mg, 1.0 mmol) was diluted in cyclohexane (0.50 ml). The $^{19}$F NMR spectrum of this mixture was taken after mixing 0.6 ml of the mixture with 0.2 ml of $d_8$-thf. Four different nickel pentafluorophenyl species were observed (along with $C_6F_5H$ formed as a side product from reaction of the pentafluorophenyl Grignard with portico impurities such as water or acid): Species A: −115.4 (ortho-F, 2F), −165.7 (para-F, F), −168.4 (meta-F, 2F); Species B: −114.4 (ortho-F, 2F), −116.1 (ortho-F, 4F), −168.1 (para-F, 1F), −169.0 (para-F, 2F), −165.2

Figure 6:
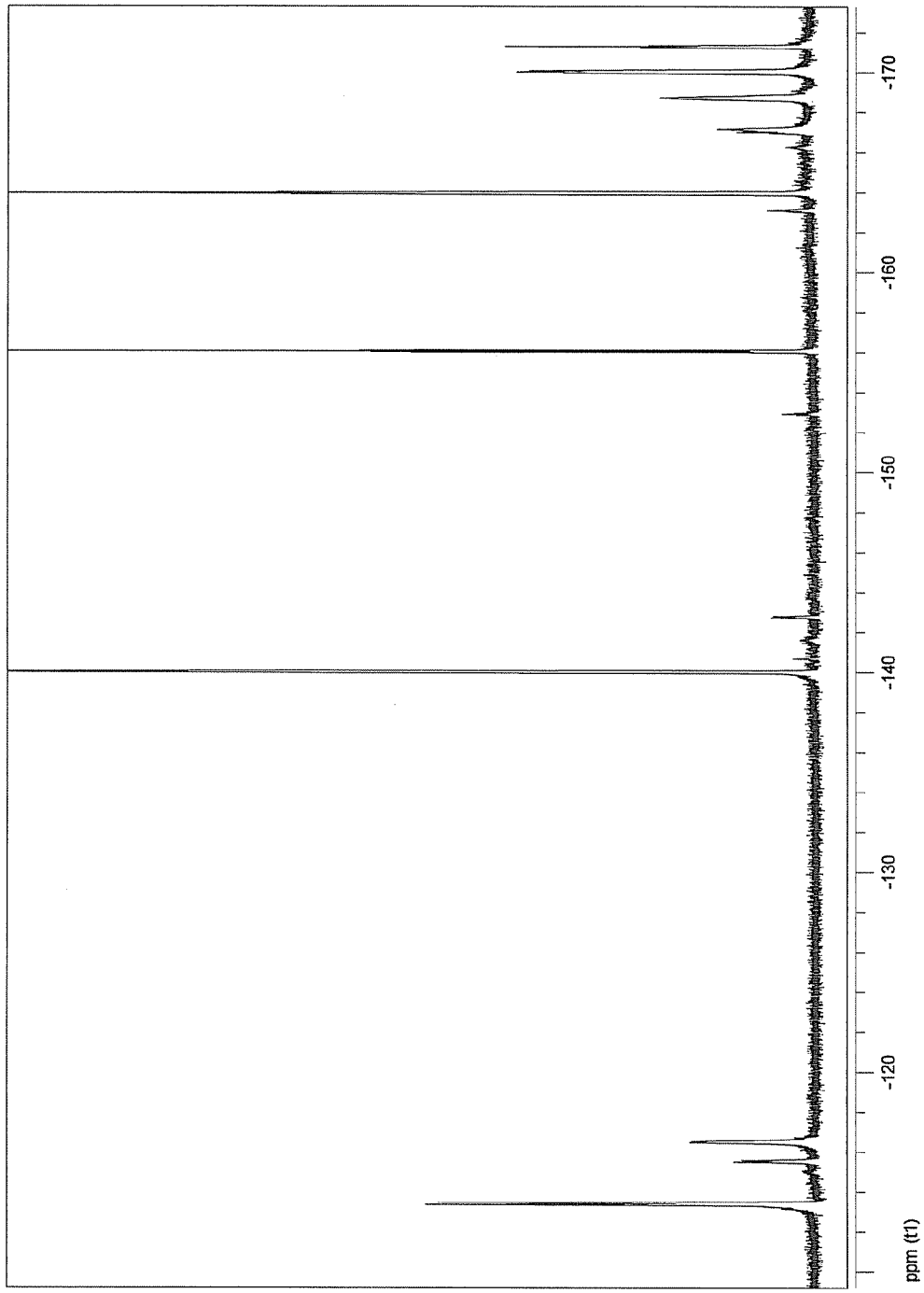
FIG. 6 shows a $^{19}F$ NMR spectrum of a Group 10 catalyst made in the manner of Catalyst Example 4.

(meta-F, 2F), −166.0 (meta-F, 4F); Species C: −116.2 (ortho-F, 2F), −167.4 (para-F, F), −168.8 (meta-F, 2F); Species T: −113.9 (ortho-F, 2F), −170.8 (para-F, F), −169.8 (meta-F, 2F). The $^{19}$F NMR spectrum is shown in FIG. 6. The integral ratio of the Species A, B, C & T was 9%, 2%, 25% & 64% respectively.

Catalyst Example 5

Figure 7:
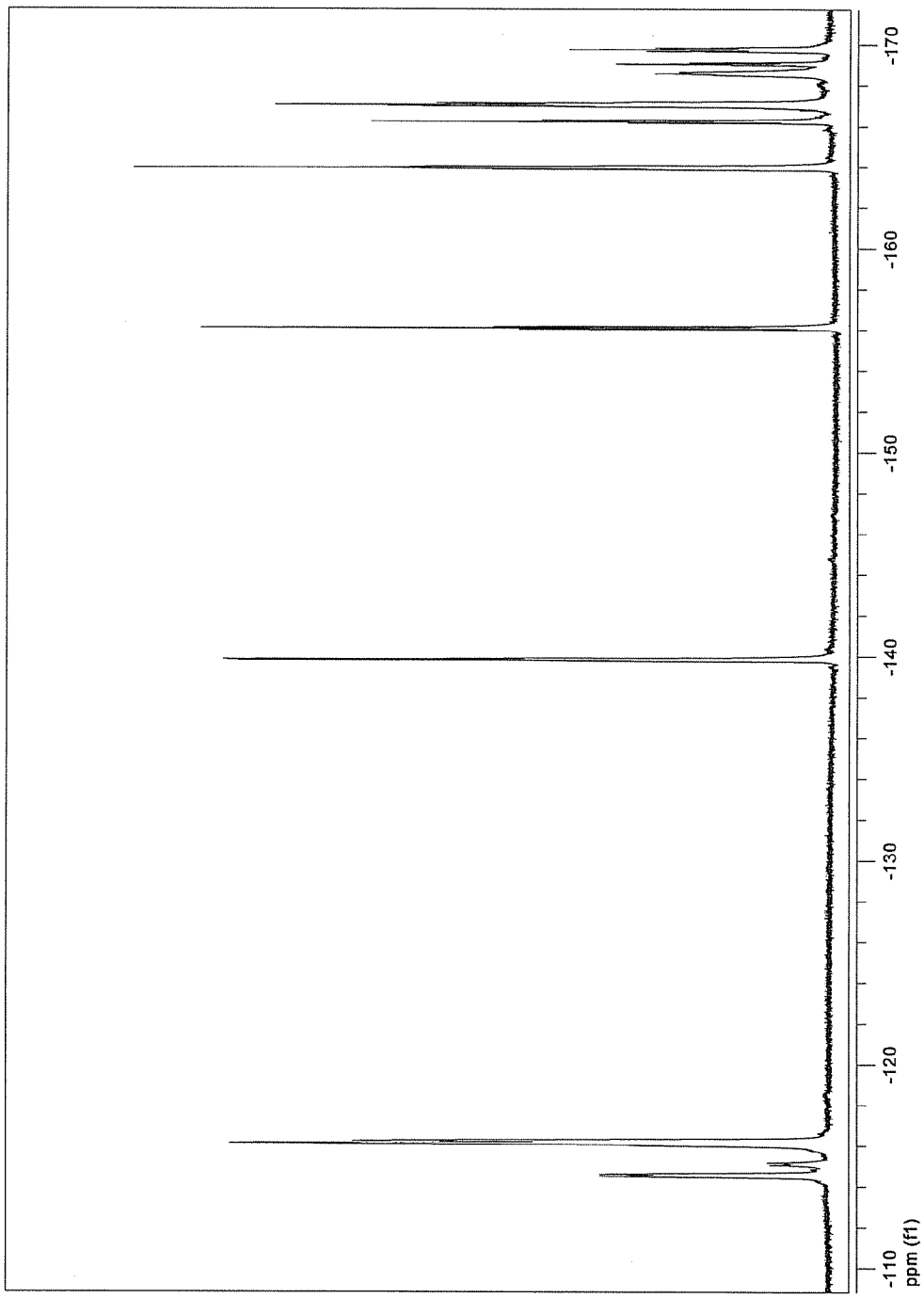
FIG. 7 shows a $^{19}F$ NMR spectrum of a Group 10 catalyst made in the manner of Catalyst Example 5.

$^i$PrMgCl (2.0 ml, 4.0 mmol) was diluted in thf (6.5 ml). Then $C_6F_5Br$ (0.98 g, 4.0 mmol) was added dropwise to the $^i$PrMgCl solution at room temperature, to give a clear yellow solution. This yellow solution was added dropwise to a green solution of [Ni(acac)$_2$] (0.2 g, 0.78 mmol) in thf (2 ml) at room temperature. The $^{19}$F NMR spectrum of the resulting mixture was taken after mixing 0.6 ml of the mixture with 0.2 ml of d$_8$-thf. Three different nickel pentafluorophenyl species were observed (along with $C_6F_5H$ formed as a side product from reaction of the pentafluorophenyl Grignard with portico impurities such as water or acid): Species A: −115.4 (ortho-F, 2F), −165.7 (para-F, F), −168.4 (meta-F, 2F); Species B: −114.4 (ortho-F, 2F), −116.1 (ortho-F, 4F), −168.1 (para-F, 1F), −169.0 (para-F, 2F), −165.2 (meta-F, 2F), −166.0 (meta-F, 4F); Species C: −116.2 (ortho-F, 2F), −167.4 (para-F, F), −168.8 (meta-F, 2F); The $^{19}$F NMR spectrum is shown in FIG. 7. The integral ratio of the Species A, B, & C was 7%, 67%, & 26% respectively.

Catalyst Example 6

Species C $^i$PrMgCl (2.0 ml, 4.0 mmol) was diluted in thf (6.5 ml). Then $C_6F_5Br$ (0.98 g, 4.0 mmol) was added dropwise to the $^i$PrMgCl solution at room temperature, to give a clear yellow solution. This yellow solution was added dropwise to a green solution of [Ni(acac)$_2$] (0.2 g, 0.78 mmol) in thf (2 ml) at room temperature. Then n-hexane (10 ml) was added dropwise added to this mixture and the mixture was cooled at 4° C. After three days, red crystals were obtained and filtered [Ni $(C_6F_5)_2(\mu$-Cl)$_2$Mg(thf)$_4$] (0.3 g, 0.39 mmol, 50% yield). These crystals were suitable for X-ray diffraction, FIG. 8. The crystals were soluble in a mixture of thf/EtOAc (50:50), and $^{19}$F NMR spectrum of the dissolved crystals was taken after mixing 0.6 ml of the nickel solution with 0.2 ml of d$_8$-thf. Species C: −116.2 (ortho-F, 2F), −167.4 (para-F, F), −168.8 (meta-F, 2F), the crystal structure for Species C and its $^{19}$F NMR spectrum are shown in FIGS. 8 and 9, respectively.

Catalyst Example 7

Species T $^i$PrMgCl (0.50 ml, 1.0 mmol) was diluted in cyclohexane (0.5 ml). Then $C_6F_5Br$ (248 mg, 1.0 mmol) was added dropwise to the $^i$PrMgCl solution at room temperature, to give a clear yellow solution. This yellow solution was added dropwise to a [Ni(acac)$_2$] (59.1 mg, 0.23 mmol) suspension in cyclohexane (0.5 ml) at room temperature. The resulting suspension was diluted with EtOAc (2 ml) and then filtered. Then, n-hexane (10 ml) was added as an upper layer to the resulting orange mixture and cooled at 4° C. After three days the yellow crystals were obtained by diffusion of the two layers and filtered [Mg$_2$Cl$_3$(thf)$_6$][Ni(C$_6$F$_5$)$_4$] (0.13 g, 0.07 mmol, 30% yield). These crystals were suitable for single crystal X-ray diffraction study. The crystals were soluble in a mixture of thf/EtOAc, $^{19}$F NMR spectrum of the dissolved crystals solution was taken after mixing 0.6 ml of the dissolved crystal solution solution with 0.2 ml of d$_8$-thf. Species T: −113.9 (ortho-F, 2F), −170.8 (para-F, F), −169.8 (meta-F, 2F), the crystal structure for Species T and its $^{19}$F NMR spectrum are shown in FIGS. 10 and 11, respectively.

Catalyst Example 8

Figure 12:
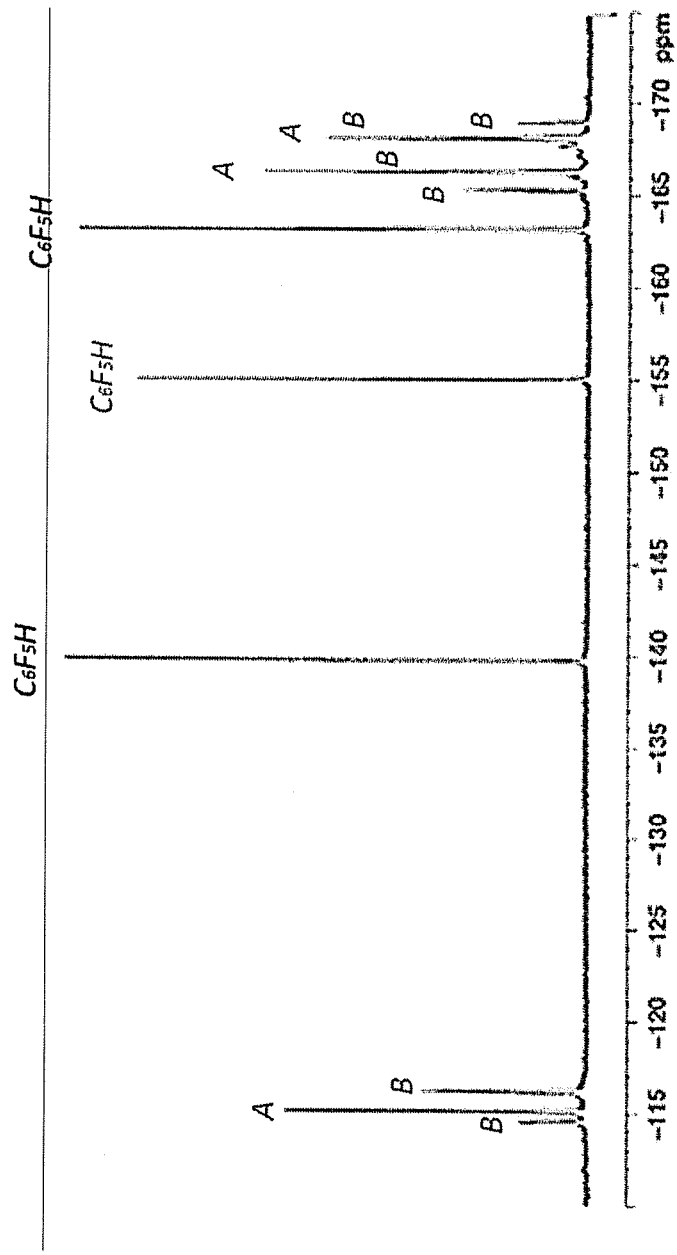
FIG. 12 depicts a $^{19}F$ NMR spectrum of a Group 10 metal catalyst made in the manner of Catalyst Example 8.

$^i$PrMgCl (0.33 ml, 0.66 mmol) was diluted in toluene (0.33 ml). Then $C_6F_5Br$ (160.0 mg, 0.66 mmol) was added dropwise at room temperature to yield a clear yellow solution. The yellow solution was then added dropwise to a solution of [Ni(Ethex)$_2$] (93.0 mg, 0.27 mmol) in toluene (0.2 ml) at room temperature and the resulting mixture was diluted with toluene to bring the mixture's concentration, based on Ni, to 0.2M. The $^{19}$F NMR spectrum of this mixture was obtained after mixing 0.6 ml of the mixture with 0.2 ml of d$_8$-thf. Two different nickel pentafluorophenyl species were observed in the $^{19}$F NMR spectrum of this solution: Species A: −115.2 (ortho-F, 2F), −166.3 (para-F, F), −168.1 (meta-F, 2F); Species B: −114.7 (ortho-F, 2F), −116.3 (ortho-F, 4F), −167.8 (para-F, 1F), −168.3 (para-F, 2F), −165.3 (meta-F, 2F), −166.4 (meta-F, 4F). The $^{19}$F NMR spectrum is shown in FIG. 12.

Catalyst Example 9

$^i$PrMgCl (0.37 ml, 0.74 mmol) was diluted in cyclohexane (0.38 ml). $C_6F_5Br$ (183.0 mg, 0.74 mmol) was added dropwise to the $^i$PrMgCl solution at room temperature to give a clear yellow solution. This solution was added dropwise to [Pd(acac)$_2$] (65.36 mg, 0.21 mmol) at room temperature and the resulting mixture was diluted with EtOAc to bring the mixture concentration, based on Pd, to 0.2M.

Synthesis Example 1

A mixture of MGENB (53.7 g, 298 mmol), DeNB (116.3 g, 497 mmol) and PENB (39.4 g, 199 mmol) in cyclohexane (668 ml) and MEK (116 ml) was added to the reactor. The mixture of monomers was sparged with nitrogen for 15 min and heated to 60° C. Once temperature was reached, 41.2 ml of a 0.2 M mixture of Catalyst from Catalyst Example 1 was added to the monomer reaction mixture. After catalyst removal, the polymerization solution was combined with MeOH to precipitate the polymer. The polymer was isolated by filtration and then dried in a vacuum oven overnight. Yield 186.4 g (89%). Mw=69200 and Mn=30000.

Synthesis Example 2

A mixture of MGENB (14.9 g, 83 mmol), DeNB (19.4 g, 83 mmol) and PENB (21.9 g, 110 mmol) in toluene (175 ml) and MEK (21 ml) was placed into a reactor equipped with stirring. The mixture of monomers was sparged with nitrogen for 15 min and heated to 60° C. Once temperature was reached, 13.8 ml of a 0.2 M mixture from Catalyst Example 8 was added to the monomer reaction mixture. The mixture was stirred for 5 h. After catalyst removal, the polymerization solution was combined with MeOH to precipitate the polymer. The polymer was isolated by filtration and then dried in a vacuum oven overnight. Yield 47 g (87%). Mw=64900 and Mn=32400.

Synthesis Example 3

A mixture of MGENB (14.9 g, 83 mmol), DeNB (19.4 g, 83 mmol) and PENB (21.9 g, 110 mmol) in heptane (203 ml)

and MAK (32 ml) was placed into a reactor equipped with stirring. The mixture of monomers was sparged with nitrogen for 15 min and heated to 50° C. Once temperature was reached, 55.0 ml of a 0.2 M mixture from Catalyst Example 1 was added to the monomer reaction mixture. The mixture was stirred for 3 h. Then the reaction was terminated with the addition of water (5 ml). Yield 54.5 g (97%). Mw=88200 and Mn=33900.

Synthesis Example 4

A mixture of MGENB (13.4 g, 74 mmol), DeNB (29.1 g, 124 mmol) and PENB (9.84 g, 50 mmol) in EtOAc (90 ml) and cyclohexane (98 ml) was placed into a reactor equipped with stirring. The mixture of monomers was sparged with nitrogen for 15 min and heated to 50° C. Once temperature was reached, 41.2 ml of a 0.2 M mixture of Catalyst Example 1 was added to the monomer reaction mixture. The mixture was stirred for 3 h. Then the reaction was terminated with the addition of water (5 ml). Yield 47.1 g (94%). Mw=83800 and Mn=32400.

Synthesis Examples 5-14

The activity of the different catalytic mixtures obtained by addition of differing amount of pentafluorophenyl Grignard equivalents to Group 10 metal compounds in the copolymerization of DeNB/MGENB (70/30) was studied in Examples 5-14. Specifically, the following examples illustrate the change in molecular weight (Mw), polydispersity (PD) and yield of a resulting polymer as a function of the amount of pentafluorophenyl Grignard added to the Group 10 metal compounds.

Synthesis Example 5

A mixture of MGENB (1.4 g, 7.8 mmol), DeNB (4.2 g, 17.9 mmol) in cyclohexane (18.5 ml) and MEK (2.5 ml) was added to a reactor. The mixture of monomers was sparged with nitrogen for 15 min and heated to 60° C. Once temperature was reached, 1.0 ml of a 0.2 M mixture of Catalyst Example 1 was added to the monomer reaction mixture. The mixture was stirred at 60° C. for 3 h. Then the reaction was terminated with the addition of water (0.5 ml).

This experiment was repeated in each of Examples 6-14, except that the amount of pentafluorophenyl Grignard was changed as indicated in Table 2, shown below:

TABLE 2

Effect of equivalents of pentafluorophenyl Grignard on DeNB/MGENB (70/30) polymerization

| Ex# | Eq. of Grignard per Ni | [Ni(acac)$_2$] (mg) | iPrMgCl (ml) | C$_6$F$_5$Br (g) | Yield (%) | Mw *1000 | Mn *1000 | PD |
|---|---|---|---|---|---|---|---|---|
| 5 | 1 | 55.2 | 0.1 | 0.10 | 0 | — | — | — |
| 6 | 2 | 55.2 | 0.2 | 0.21 | 84 | 99 | 47 | 2.1 |
| 7 | 3 | 55.2 | 0.3 | 0.32 | 88 | 65 | 27 | 2.4 |
| 8 | 3.5 | 55.2 | 0.35 | 0.37 | 93 | 62 | 30 | 2.1 |
| 9 | 4 | 55.2 | 0.4 | 0.42 | 96 | 71 | 29 | 2.4 |
| 10 | 5 | 55.2 | 0.5 | 0.52 | 96 | 79 | 30 | 2.6 |
| 11 | 6 | 55.2 | 0.6 | 0.63 | 96 | 98 | 29 | 3.4 |
| 12 | 7 | 55.2 | 0.7 | 0.74 | 83 | 118 | 40 | 2.9 |
| 13 | 8 | 55.2 | 0.8 | 0.84 | 86 | 107 | 44 | 2.4 |
| 14 | 10 | 55.2 | 1.0 | 1.05 | 84 | 96 | 31 | 3.1 |

Figure 13:
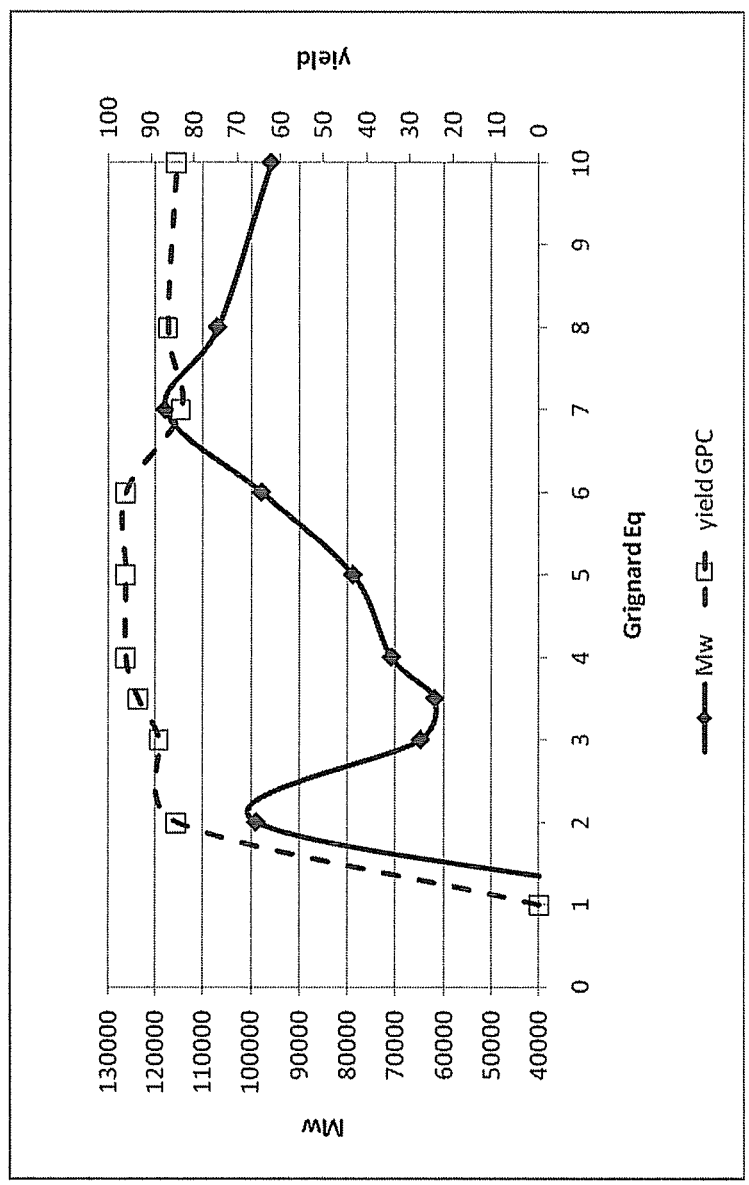
FIG. 13 is a graph showing the effect of equivalents of halohydrocarbyl Grignard versus Mw and yield for a resultant copolymer in the manner of Synthesis Example 5.
Figure 14:
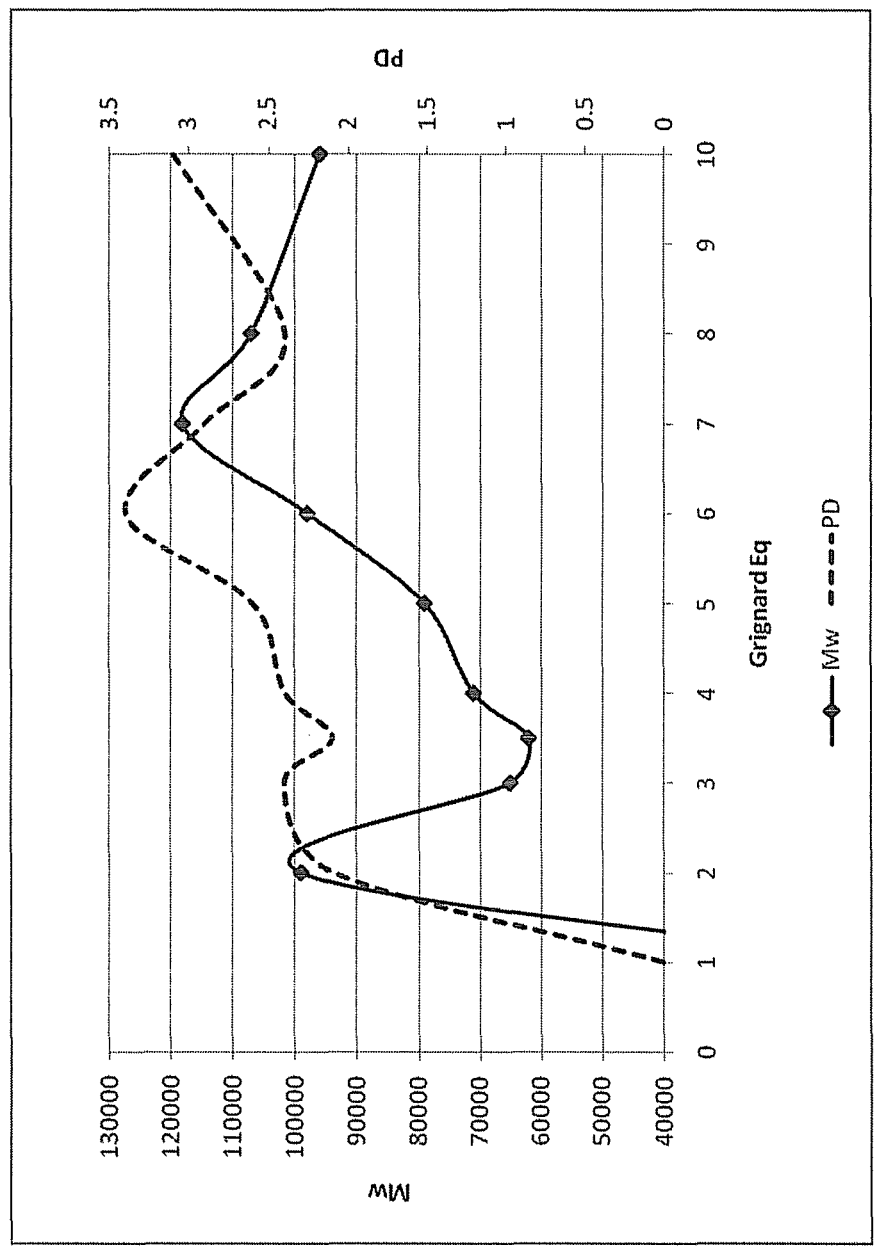
FIG. 14 is a graph showing the effect of equivalents of halohydrocarbyl Grignard versus Mw and PD for a resultant copolymer in the manner of Synthesis Example 5.

Referring to FIGS. 13 and 14, the data of Table 2 is presented graphically. Specifically, the number of equivalents of pentafluorophenyl Grignard added to nickel in the Ni(acac)$_2$ system of Examples 5-14 are plotted against Yield and Mw in FIG. 13 and against PD and Mw in FIG. 14.

Synthesis Examples 15 Through 18

These examples demonstrate the activity of Group 10 metal catalyst at different temperatures in the polymerization of DeNB/PENB/MGENB.

For each polymerization, a mixture of MGENB (1.5 g, 8.3 mmol), DeNB (1.9 g, 8.3 mmol) and PENB (2.2 g, 11.1 mmol) in toluene (16 ml) and MEK (4.2 ml) was placed into a reactor equipped with stirring. The mixture of monomers was sparged with nitrogen for 15 min and then heated to the temperature indicated in Table 3, below, for each experimental run. Once the temperature indicated in Table 3 was reached, 1.2 ml of a 0.2 M mixture of the catalyst complex of Catalyst Example 8 was added to the monomer reaction mixture. The reaction mixture was then stirred for 3 h and then terminated with the addition of water (0.5 ml). For each example, the amount of metal complex added was 93 mg, the amount of $^i$PrMgCl was 0.45 ml, and the amount of C$_6$F$_5$Br was 0.22 g. The temperature, conversion, Mw, Mn and PD for each run is provided in the aforementioned Table 3.

TABLE 3

| Ex# | Temp (° C.) | Conv (%) | Mw | Mn | PD |
|---|---|---|---|---|---|
| 15 | 40 | 100 | 102000 | 48000 | 2.1 |
| 16 | 50 | 96 | 80800 | 38000 | 2.2 |
| 17 | 60 | 97 | 55000 | 30000 | 1.8 |
| 18 | 80 | 86 | 37600 | 21200 | 1.8 |

Synthesis Examples 19-24

The following examples illustrate the activity of a Group 10 metal catalyst with different monomers.

Synthesis Example 19

A monomer, TFSNB (25.78 mmol), was diluted with cyclohexane and MEK to produce a 25% by weight monomer solution. This solution was added to an appropriate reactor and the monomer mixture sparged with nitrogen for 15 min and then heated to 60° C. Once the temperature was reached, 1.0 ml of a 0.2 M mixture of the catalyst complex of Catalyst Example 1 was added to the monomer reaction mixture. The reaction mixture was stirred at 60° C. for 3 h and then terminated with the addition of water (0.5 ml).

For each of Examples 20-24, the procedure of Synthesis Example 19 was repeated except that the monomers were changed to that indicated in Table 4, below.

TABLE 4

| Ex # | Monomer(s) | Yield (%) | Mw | Mn | PD |
|---|---|---|---|---|---|
| 19 | TFSNB | 3 | 5,100 | 4,400 | 1.2 |
| 20 | DeNB/PENB/MGENB | 95 | 67,000 | 33,000 | 2.0 |
| 21 | DeNB/MGENB | 94 | 79,000 | 37,000 | 2.1 |
| 22 | HFANB | 23 | 22,000 | 19,000 | 1.2 |
| 23 | tBuEsNB | 24 | 22,000 | 13,000 | 1.7 |
| 24 | MeOAcNB | 60 | 31,000 | 19,000 | 1.6 |

Synthesis Examples 25-33

The following examples illustrate the activity of Catalyst Complexes having a metal other than Ni.

The general procedure of Catalyst Example 1 was used to form the Catalyst Complexes employed except that for each experiment, the amount of $^i$PrMgCl and $C_6F_5Br$, and the amount and specific metal complex were as indicated in Table 5, below. For the polymerization (or attempted polymerizations) the Catalyst Complex made for each Experiment was injected into a reactor containing a mixture of MGENB (1.4 g, 7.8 mmol), DeNB (4.2 g, 17.9 mmol) in cyclohexane (18.5 ml) and MEK (2.5 ml), preheated to 60° C. The reaction mixture was maintained at temperature and stirred 3 h and then terminated with the addition of water (0.5 ml). As the table indicates, for Examples 29-32, where a Group 10 metal complex was not used, no polymerization product was observed while for Examples 25-28 and 31, where a Group 10 metal complex was employed, polymerization of the monomers was observed.

TABLE 5

| Ex # | Metal complex | Metal complex (mg) | $^i$PrMgCl (ml) | $C_6F_5Br$ (g) | Yield (%) | Mw | Mn | PD |
|---|---|---|---|---|---|---|---|---|
| 25 | [Ni(acac)$_2$] | 55.2 | 0.37 | 0.18 | 94 | 79,000 | 37,000 | 2.1 |
| 26 | [Ni(Ethex)$_2$] | 93.0 | 0.33 | 0.16 | 94 | 60,000 | 33,000 | 1.8 |
| 27 | [Ni(stearate)$_2$] | 86.0 | 0.33 | 0.16 | 30 | 57,000 | 32,000 | 1.8 |
| 28 | Li$_2$[NiBr$_4$]* | 490.0 | 0.33 | 0.16 | 87 | 118,000 | 55,000 | 2.1 |
| 29 | [Cu(acac)$_2$] | 56.3 | 0.37 | 0.18 | 0 | — | — | — |
| 30 | [Co(acac)$_3$] | 76.6 | 0.37 | 0.18 | 0 | — | — | — |
| 31 | [Ag(acac)] | 44.5 | 0.37 | 0.18 | 0 | — | — | — |
| 32 | [Rh(acac)$_3$] | 86.0 | 0.37 | 0.18 | 0 | — | — | — |
| 33 | [Pd(acac)$_2$] | 65.4 | 0.37 | 0.18 | 80 | 25,500 | 17,000 | 1.5 |

*0.5M solution in thf.

Synthesis Examples 34-39

The following examples illustrate that the combination of Group 10 metal complexes with both $^i$PrMgCl and $C_6F_5Br$ is necessary to generate a catalytically active species. Specifically, as shown in Table 6, below, for each of an exemplary Ni and Pd metal complex a polymerization reaction was attempted three times. In two of these reactions, one of the $^i$PrMgCl or $C_6F_5Br$ was omitted and in the third attempt both were present. It is readily seen that only where both the $^i$PrMgCl and $C_6F_5Br$ were provided was polymer product obtained. The procedures followed for each of Examples 34-39 are provided below as is Table 6.

Synthesis Example 34

All solvents used were anhydrous and all the manipulations were carried out inside of a dry box. $^i$PrMgCl (0.33 ml, 0.66 mmol) was diluted in toluene (0.33 ml). This solution was added dropwise to [Ni(Ethex)$_2$] (93.0 mg, 0.27 mmol) at room temperature and the resulting mixture was diluted with toluene up to 0.2 M concentration based on the metal (Ni).

This solution was injected to a mixture of MGENB (1.4 g, 7.8 mmol), DeNB (4.2 g, 17.9 mmol) in toluene (16.7 ml) and MEK (2.5 ml) was added to a reactor and heated to 60° C. The mixture was stirred at 60° C. for 3 h. Then the reaction was terminated with the addition of water (0.5 ml).

Synthesis Example 35

All the solvents used were anhydrous and all the manipulations were carried out inside of a dry box was diluted $C_6F_5Br$ (163.0 mg, 0.66 mmol) in toluene (0.33 ml). This solution was added dropwise to [Ni(Ethex)$_2$] (93.0 mg, 0.27 mmol) at room temperature and the resulting mixture was diluted with toluene up to 0.2 M concentration based on the metal.

This diluted mixture was injected into a reactor with a mixture of MGENB (1.4 g, 7.8 mmol), DeNB (4.2 g, 17.9 mmol) in toluene (16.7 ml) and MEK (2.5 ml) and heated to 60° C. The reaction mixture was stirred at 60° C. for 3 h. Then the reaction was terminated with the addition of water (0.5 ml).

Synthesis Example 36

All the solvents used were anhydrous and all the manipulations were carried out inside of a dry box. iPrMgCl (0.33 ml, 0.66 mmol) was diluted in toluene (0.33 ml). Then C6F5Br (163.0 mg, 0.66 mmol) was added dropwise to the iPrMgCl solution at room temperature to yield a clear yellow solution. This solution was added dropwise to the [Ni(Ethex)$_2$] (93.0 mg, 0.27 mmol) at room temperature and the resulting mixture was diluted with toluene to a concentration of 0.2 M concentration based on Ni.

This diluted mixture was injected into a reactor with a mixture of MGENB (1.4 g, 7.8 mmol), DeNB (4.2 g, 17.9 mmol) in toluene (16.7 ml) and MEK (2.5 ml) and heated to 60° C. The reaction mixture was stirred at 60° C. for 3 h. Then the reaction was terminated with the addition of water (0.5 ml).

Synthesis Example 37

All the solvents used were anhydrous and all the manipulations were carried out inside of a dry box. $^i$PrMgCl (0.37 ml, 0.74 mmol) was diluted in cyclohexane (0.37 ml). This solution was added dropwise to [Pd(acac)$_2$] (65.36 mg, 0.21 mmol) at room temperature and the resulting mixture was diluted with EtOAc up to a concentration of 0.2 M concentration based on the metal (Pd).

This diluted mixture was injected into a reactor with a mixture of MGENB (1.4 g, 7.8 mmol), DeNB (4.2 g, 17.9 mmol) in cyclohexane (18.5 ml) and MEK (2.5 ml) and heated to 60° C. The reaction mixture was stirred at 60° C. for 3 h. Then, the reaction was terminated with the addition of water (0.5 ml).

Synthesis Example 38

All the solvents used were anhydrous and all the manipulations were carried out inside of a dry box. C$_6$F$_5$Br (183.0 mg, 0.74 mmol) was diluted in cyclohexane (0.37 ml). This solution was added dropwise to [Pd(acac)$_2$] (65.36 mg, 0.21 mmol) at room temperature and the resulting solutions were diluted with EtOAc to a concentration of 0.2 M concentration based on the metal (Pd).

This diluted mixture was injected into a reactor with a mixture of MGENB (1.4 g, 7.8 mmol), DeNB (4.2 g, 17.9 mmol) in cyclohexane (18.5 ml) and MEK (2.5 ml) and heated to 60° C. The reaction mixture was stirred at 60° C. for 3 h. Then, the reaction was terminated with the addition of water (0.5 ml).

Synthesis Example 39

All the solvents used were anhydrous and all the manipulations were carried out inside of a dry box. $^i$PrMgCl (0.37 ml, 0.74 mmol) was diluted in toluene (0.37 ml). Then, C$_6$F$_5$Br (183.0 mg, 0.74 mmol) was added dropwise to the iPrMgCl solution at room temperature to yield a clear yellow solution. This yellow solution was added dropwise to [Pd(acac)$_2$] (65.36 mg, 0.21 mmol) at room temperature and the resulting mixture was diluted with EtOAc to a concentration of 0.2 M based on the metal (Pd).

This diluted mixture was injected into a reactor with a mixture of MGENB (1.4 g, 7.8 mmol), DeNB (4.2 g, 17.9 mmol) in cyclohexane (18.5 ml) and MEK (2.5 ml) and heated to 60° C. The reaction mixture was stirred at 60° C. for 3 h. Then, the reaction was terminated with the addition of water (0.5 ml).

THF (23.3 g, 47.7 mmol) was diluted by addition of cyclohexane (18.5 g, 225 mmol). Then, C$_6$F$_5$Br (11.8 g, 47.7 mmol) was added dropwise to the $^i$PrMgCl solution while stirring at 0° C. to yield a clear yellow solution. This yellow solution was added to Ni(acac)$_2$ (3.5 g, 13.64 mmol) while stirring at room temperature and the resulting mixture was diluted with EtOAc (21.42 g, 243 mmol).

This diluted mixture was injected to a reactor with a mixture of MGENB (88.4 g, 491 mmol), DeNB (115.0 g, 491 mmol), PENB (129.7 g, 654 mmol), cyclohexane (1045 g, 10.43 mol) and MEK (189.3 g, 2.15 mol), which was preheated to 52.5° C. After the completion of catalyst injection, the reaction mixture was heated up to 67.5° C. at a temperature ramp rate of approximately 0.43° C./min, and then held constant. The reaction mixture was stirred for 3 hours after the catalyst injection. Then, the reaction was terminated by addition of water (5 g).

Synthesis Example 41

All the solvents used were anhydrous and all the manipulations were carried out under nitrogen. C$_6$F$_5$Br (11.8 g, 47.7 mmol) was added dropwise to a 1.0 M ethylmagnesium bromide (EtMgBr) solution in THF (47.7 g, 47.7 mmol) while stirring at room temperature to yield a clear yellow solution. This yellow solution was added to Ni(acac)$_2$ (3.5 g, 13.64 mmol) while stirring at room temperature.

The resulting mixture was injected into a reactor with a mixture of MGENB (88.4 g, 491 mmol), DeNB (115.0 g, 491 mmol), PENB (129.7 g, 654 mmol), cyclohexane (1045 g, 10.43 mol) and MEK (189.3 g, 2.15 mol), which was preheated to 52.5° C. After the completion of catalyst injection, the reaction mixture was heated up to 67.5° C. at a temperature ramp rate of approximately 0.43° C./min, and then held constant. The reaction mixture was stirred for 3 hours after the catalyst injection. Then the reaction was terminated by addition of water (5 g).

Synthesis Example 42

All the solvents used were anhydrous and all the manipulations were carried out under nitrogen. C$_6$F$_5$Br (11.8 g, 47.7 mmol) was added dropwise to a 1.0 M isopropylmagnesium bromide ($^i$PrMgBr) solution in THF (46.8 g, 47.7 mmol) while stirring at 0° C. to yield a clear yellow solution. This

TABLE 6

| Ex# | Metal complex | Metal complex (mg) | $^i$PrMgCl (ml) | C$_6$F$_5$Br (g) | Yield (%) | Mw × 1000 | Mn × 1000 | PD |
|---|---|---|---|---|---|---|---|---|
| 34 | [Ni(Ethex)$_2$] | 93.0 | 0.33 | — | 0 | — | — | — |
| 35 | [Ni(Ethex)$_2$] | 93.0 | — | 0.16 | 0 | — | — | — |
| 36 | [Ni(Ethex)$_2$] | 93.0 | 0.33 | 0.16 | 94 | 60 | 33 | 1.8 |
| 37 | [Pd(acac)$_2$] | 65.4 | 0.37 | — | 0 | — | — | — |
| 38 | [Pd(acac)$_2$] | 65.4 | — | 0.18 | 0 | — | — | — |
| 39 | [Pd(acac)$_2$] | 65.4 | 0.37 | 0.18 | 80 | 25.5 | 17 | 1.5 |

Synthesis Example 40 Through 46

The following examples illustrate the activity of Catalyst Complexes prepared using various types of alkyl magnesium halides, species containing a pentafluorophenyl group, and nickel salts.

Synthesis Example 40

All the solvents used were anhydrous and all the manipulations were carried out under nitrogen. 2.0M $^i$PrMgCl in yellow solution was added to Ni(acac)$_2$ (3.5 g, 13.64 mmol) while stirring at room temperature.

The resulting mixture was injected into a reactor with a mixture of MGENB (88.4 g, 491 mmol), DeNB (115.0 g, 491 mmol), PENB (129.7 g, 654 mmol), cyclohexane (1045 g, 10.43 mol) and MEK (189.3 g, 2.15 mol), which was preheated to 52.5° C. After the completion of catalyst injection, the reaction mixture was heated up to 67.5° C. at a temperature ramp rate of approximately 0.43° C./min, and then held constant. The reaction mixture was stirred for 3 hours after the catalyst injection. Then, the reaction was terminated by addition of water (5 g).

Synthesis Example 43

All the solvents used were anhydrous and all the manipulations were carried out under nitrogen. 2.0M $^i$PrMgCl in THF (23.3 g, 47.7 mmol) was diluted in cyclohexane (18.5 g, 225 mmol). Then, pentafluorobenzene ($C_6F_5H$) (8.0 g, 47.7 mmol) was added dropwise to the $^i$PrMgCl solution while stirring at 0° C. to yield a clear yellow solution. This yellow solution was added to Ni(acac)$_2$ (3.5 g, 13.64 mmol) while stirring at room temperature and the resulting mixture was diluted with EtOAc (21.42 g, 243 mmol).

This diluted mixture was injected into a reactor with mixture of MGENB (88.4 g, 491 mmol), DeNB (115.0 g, 491 mmol), PENB (129.7 g, 654 mmol), cyclohexane (1045 g, 10.43 mol) and MEK (189.3 g, 2.15 mol), which was preheated to 52.5° C. After the completion of catalyst injection, the reaction mixture was heated up to 67.5° C. at a temperature ramp rate of approximately 0.43° C./min, and then held constant. The reaction mixture was stirred for 3 hours after the catalyst injection. Then, the reaction was terminated by addition of water (5 g).

Synthesis Example 44

All the solvents used were anhydrous and all the manipulations were carried out under nitrogen. Pentafluorobenzene ($C_6F_5H$) (8.0 g, 47.7 mmol) was added dropwise to 1.0 M ethylmagnesium bromide (EtMgBr) solution in THF (47.7 g, 47.7 mmol) while stirring at room temperature to yield a clear yellow solution. This yellow solution was added to Ni(acac)$_2$ (3.5 g, 13.64 mmol) while stirring at room temperature.

The resulting mixture was injected into a reactor with a mixture of MGENB (88.4 g, 491 mmol), DeNB (115.0 g, 491 mmol), PENB (129.7 g, 654 mmol), cyclohexane (1045 g, 10.43 mol) and MEK (189.3 g, 2.15 mol), which was preheated to 52.5° C. After the completion of catalyst injection, the reaction mixture was heated up to 67.5° C. at a temperature ramp rate of approximately 0.43° C./min, and then held constant. The reaction mixture was stirred for 3 hours after the catalyst injection. Then, the reaction was terminated by addition of water (5 g).

Synthesis Example 45

All the solvents used were anhydrous and all the manipulations were carried out under nitrogen. 2.0M $^i$PrMgCl in THF (23.3 g, 47.7 mmol) was diluted in cyclohexane (18.5 g, 225 mmol). Then, $C_6F_5Br$ (11.8 g, 47.7 mmol) was added dropwise to the $^i$PrMgCl solution while stirring at 0° C. to yield a clear yellow solution. This yellow solution was added to nickel tetramethyl heptanedionate (Ni(TMHD)$_2$) (5.8 g, 13.64 mmol) while stirring at room temperature and the resulting mixture was diluted with EtOAc (21.42 g, 243 mmol).

This diluted mixture was injected into a reactor with a mixture of MGENB (88.4 g, 491 mmol), DeNB (115.0 g, 491 mmol), PENB (129.7 g, 654 mmol), cyclohexane (1045 g, 10.43 mol) and MEK (189.3 g, 2.15 mol), which was preheated to 52.5° C. After the completion of catalyst injection, the reaction mixture was heated up to 67.5° C. at a temperature ramp rate of approximately 0.43° C./min, and then held constant. The reaction mixture was stirred for 3 hours after the catalyst injection. Then, the reaction was terminated by addition of water (5 g).

Synthesis Example 46

All the solvents used were anhydrous and all the manipulations were carried out under nitrogen. 2.0M $^i$PrMgCl in THF (23.3 g, 47.7 mmol) was diluted in cyclohexane (18.5 g, 225 mmol). Then, $C_6F_5Br$ (11.8 g, 47.7 mmol) was added dropwise to the $^i$PrMgCl solution while stirring at 0° C. to yield a clear yellow solution. This yellow solution was added to nickel trifluoroacetate (Ni(TFA)$_2$) (5.4 g, 13.64 mmol) while stirring at room temperature and the resulting mixture was diluted with EtOAc (21.42 g, 243 mmol).

This diluted mixture was injected into a reactor with a mixture of MGENB (88.4 g, 491 mmol), DeNB (115.0 g, 491 mmol), PENB (129.7 g, 654 mmol), cyclohexane (1045 g, 10.43 mol) and MEK (189.3 g, 2.15 mol), which was preheated to 52.5° C. After the completion of catalyst injection, the reaction mixture was heated up to 67.5° C. at a temperature ramp rate of approximately 0.43° C./min, and then held constant. The reaction mixture was stirred for 3 hours after the catalyst injection. Then, the reaction was terminated by addition of water (5 g).

The yield, Mw, Mn and PD for each of the examples 40 through 46 are provided in Table 7. Here, the yield of each run was determined by analyzing the amounts of unreacted monomers in the polymer solution by gas chromatography.

TABLE 7

| Ex# | Alkyl magnesium halide | Pentafluorophenyl-containing species | Nickel salts | Yield (%) | Mw | Mn | PD |
| --- | --- | --- | --- | --- | --- | --- | --- |
| 40 | iPrMgCl | $C_6F_5Br$ | Ni(acac)$_2$ | 93 | 64500 | 29500 | 2.17 |
| 41 | EtMgBr | $C_6F_5Br$ | Ni(acac)$_2$ | 79 | 84500 | 36000 | 2.34 |
| 42 | iPrMgBr | $C_6F_5Br$ | Ni(acac)$_2$ | 77 | 81000 | 31000 | 2.62 |
| 43 | iPrMgCl | $C_6F_5H$ | Ni(acac)$_2$ | 77 | 68000 | 33500 | 2.03 |
| 44 | EtMgBr | $C_6F_5H$ | Ni(acac)$_2$ | 77 | 83000 | 35000 | 2.39 |
| 45 | iPrMgCl | $C_6F_5Br$ | Ni(tmhd)$_2$ | 84 | 78500 | 36500 | 2.14 |
| 46 | iPrMgCl | $C_6F_5Br$ | Ni(TFA)$_2$ | 92 | 62000 | 33000 | 1.88 |

Synthesis Example 47

A mixture of MGENB (0.86 g, 4.8 mmol), DeNB (1.86 g, 7.9 mmol) and PENB (0.63 g, 3.2 mmol) in cyclohexane (10.6 ml) and MEK (1.8 ml) was placed into a reactor equipped with stirring. The mixture was sparged with nitrogen for 15 min and heated to 60° C. Once temperature was reached, [Ni($C_6F_5$)$_2$(μ-Cl)$_2$Mg(thf)$_4$] (Species C, 0.1 g, 0.13 mmol) dissolved in a mixture of thf (0.35 ml) and EtOAc (0.35 ml) was added to the monomer reaction mixture. The reaction mixture was stirred for 3 h. Then, the reaction was terminated with the addition of water (0.5 ml).

Synthesis Example 48

The general procedure of Synthesis Example 47 was used for polymerization (or attempted polymerizations) 48 except that for each experiment, the amount of specific metal complex were as indicated in Table 8, below.

A mixture of MGENB (0.86 g, 4.8 mmol), DeNB (1.86 g, 7.9 mmol) and PENB (0.63 g, 3.2 mmol) in cyclohexane (10.6 ml) and MEK (1.8 ml) was placed into a reactor equipped with stirring. The mixture was sparged with nitrogen for 15 min and heated to 60° C. Once temperature was reached, 1.5 ml of a 0.09 M mixture of the catalyst complexes of Catalyst Example 5 was added to the monomer reaction mixture. The reaction mixture was stirred for 3 h. Then, the reaction was terminated with the addition of water (0.5 ml).

achieve alternative objectives in olefin polymerization (high yield, high PD, high/low MW).

The olefin polymerization catalyst can be used immediately or stored and used at a convenient time. An advantage of the olefin polymerization catalyst described herein is that a catalyst system can be tailor made to achieve desired objectives in subsequent olefin polymerization. Another advantage of the olefin polymerization catalyst described herein is that the safety concerns typically associated with using fluorinated Grignard reagents in connection with cycloolefin polymerization are mitigated and/or eliminated.

What is claimed is:

1. A method of forming, in situ, an olefin polymerization catalyst system, comprising:

first contacting a hydrocarbyl magnesium halide, represented by $R^H MgX$ where $R^H$ is a non-halogenated hydrocarbyl and X is a halogen, with a halohydrocarbyl

TABLE 8

| Ex# | Species C<br>[Ni(C$_6$F$_5$)$_2$(μ-Cl)$_2$Mg(thf)$_4$]<br>(mmol) | Species T<br>[Mg$_2$Cl$_3$(thf)$_6$][Ni(C$_6$F$_5$)$_4$]<br>(mmol) | Species B<br>(mmol) | Species A<br>(mmol) | Yield<br>(%) | Mw ×<br>1000 | PD |
|---|---|---|---|---|---|---|---|
| 47 | 0.13 | — | — | — | 86 | 62 | 1.63 |
| 48 | — | 0.13 | — | — | 0 | — | — |
| 49 | 0.07 | 0.07 | — | — | 9 | 62 | 1.56 |
| 50 | 0.04 | — | 0.09 | 0.009 | 97 | 51 | 2.85 |

The examples illustrate how the hydrocarbyl magnesium halide and the halohydrocarbyl compound are combined to form a Grignard compound, which is in turn then contacted with a Group 10 metal compound to form a catalyst of unknown structure. While the structure and mechanism of operation of the Group to form a catalyst of a Group 10 metal which is effectively used to form a polycycloolefin.

By now it should be understood that the embodiments of the present invention present catalysts and methods for making the described polymer compositions in an advantageous and novel method. It will further be understood that such catalysts, methods, and the polymer compositions thereof, are not limited to any of the particular embodiments disclosed, but rather that as such disclosure defines the scope and spirit of the invention, such invention is intended to cover modifications of the catalysts, methods and compositions disclosed, where such are within the scope of the invention, as defined by the appended claims.

For example, in embodiments of the present invention, an olefin polymerization catalyst is formed in situ using a two step process. The olefin polymerization catalyst is formed by contacting a halohydrocarbyl Grignard with a Group 10 metal compound in a first suitable solvent system. The halohydrocarbyl Grignard is formed by contacting a hydrocarbyl magnesium halide with a halohydrocarbyl compound in a second suitable solvent system, which can be the same as or different from the first solvent system.

The olefin polymerization catalyst can be a single species or a multicomponent system containing two or active catalytic species. By varying one or more of the identity of the hydrocarbyl magnesium halide, the halohydrocarbyl compound, the Group 10 metal compound, the solvents, the concentrations of the reactive components, the conditions (temperature, pressure), one can selectively obtain certain species, multiple species, and/or desired ratios of multiple species of the olefin polymerization catalyst. Different catalytic species or different ratios of catalytic species can be employed to compound, represented by $R^F X$, where $R^F$ is a halogenated hydrocarbyl and X is a halogen, to form a halohydrocarbyl Grignard, represented by $R^F MgX$; and second contacting the halohydrocarbyl Grignard with a Group 10 metal compound to form, in situ, the olefin polymerization catalyst system, the olefin polymerization catalyst system having two or more distinct catalytically active species.

2. The method of claim 1, wherein the hydrocarbyl magnesium halide is at least one selected from the group consisting of alkylmagnesium iodides, arylmagnesium iodides, alkylmagnesium chlorides, alkylmagnesium bromides, arylmagnesium chlorides, arylmagnesium bromides, alkenylmagnesium chlorides, and alkenylmagnesium bromides.

3. The method of claim 2, where the hydrocarbyl magnesium halide is at least one selected from the group consisting of benzylmagnesium iodide, n-butylmagnesium iodide, allylmagnesium chloride, benzylmagnesium chloride, benzylmagnesium chloride, n-butylmagnesium bromide, n-butylmagnesium chloride, t-butylmagnesium chloride, 4-chlorophenylmagnesium bromide, cyclohexylmagnesium chloride, cyclopentadienylmagnesium chloride, cyclopentylmagnesium chloride, cyclopropylmagnesium bromide, 3,5-dimethylphenylmagnesium bromide, ethylmagnesium bromide, ethylmagnesium chloride, n-heptylmagnesium bromide, n-hexylmagnesium bromide, isobutylmagnesium bromide, isobutylmagnesium chloride, isopropylmagnesium bromide, isopropylmagnesium chloride, 4-methoxyphenylmagnesium bromide, methylmagnesium bromide, methylmagnesium chloride, n-octylmagnesium chloride, n-pentylmagnesium bromide, n-pentylmagnesium chloride, phenylmagnesium bromide, phenylmagnesium chloride, n-propylmagnesium bromide, n-propylmagnesium chloride, 2-tolylmagnesium chloride, 4-tolylmagnesium chloride, [(trimethylsilyl)methyl]magnesium chloride, and vinylmagnesium bromide.

4. The method of claim 1, wherein the halohydrocarbyl compound is at least one selected from the group consisting of halobenzenes, haloalkylsubstituted halobenzenes, and halotoluenes.

5. The method of claim 4, where the halohydrocarbyl compound is selected from the group consisting of chloropentafluorobenzene, bromopentafluorobenzene, iodopentafluorobenzene, di-trifluoromethyl-bromo-benzene, trifluoromethyl-bromo-benzene, difluorophenyl bromide, trifluorophenyl bromide, tetrafluorophenyl bromide, bromotrichlorobenzene, bromotetrachlorobenzene, bromopentachlorobenzene, 2,4,6-trifluoro-3,5-dichlorophenyl bromide, di-trifluoromethyl-fluoro-chloromethane and pentafluorobenzene.

6. The method of claim 1, wherein the halohydrocarbyl Grignard is at least one selected from the group consisting of halophenylmagnesium halide, haloalkylsubstituted phenylmagnesium halide, and halotoluene magnesium halide.

7. The method of claim 6, where the halohydrocarbyl Grignard is at least one selected from the group consisting of pentafluorophenylmagnesium bromide, pentafluorophenylmagnesium chloride, di-trifluoromethyl-phenylmagnesium bromide, di-trifluoromethyl-phenylmagnesium chloride, tri-trifluoromethyl-phenylmagnesium bromide, tri-trifluoromethyl-phenylmagnesium chloride, trifluoromethyl-phenylmagnesium bromide, trifluoromethyl-phenylmagnesium chloride, difluorophenylmagnesium bromide, difluorophenylmagnesium chloride, trifluorophenylmagnesium bromide, tetrafluorophenylmagnesium bromide, 2,4,6-trifluoro-3,5-dichlorophenylmagnesium bromide, di-trifluoromethyl-fluoro-methyl-magnesium chloride, di-trifluoromethyl-fluoro-methyl-magnesium bromide, trichlorophenylmagnesium bromide, trichlorophenylmagnesium chloride, tetrachlorophenylmagnesium bromide, tetrachlorophenylmagnesium chloride, pentachlorophenylmagnesium bromide and pentachlorophenylmagnesium chloride.

8. The method of claim 1, wherein the Group 10 metal compound is at least one selected from the group consisting of nickel acetate, nickel acetylacetonate, nickel ethylhexanoate, nickel naphthenate, nickel trifluoroacetate, nickel hexafluoroacetylacetonate, nickel carboxylates, nickel cyclohexanebutyrate, nickel octanoate, and nickel stearate.

9. The method of claim 1, where the Group 10 metal compound is at least one selected from the group consisting of nickel dibenzoylmethanate, nickel benzoylmethanate, nickel carboxylates, nickel cyclohexanebutyrate, nickel octanoate, nickel stearate, palladium acetate, palladium acetylacetonate, palladium ethylhexanoate, palladium propionate, palladium trifluoroacetate, palladium hexafluoroacetylacetonate, palladium carboxylates, and platinum acetylacetonate.

10. The method of claim 1, where the two or more distinct catalytically active species comprise pentafluorophenyl ligands.

11. The method of claim 1, where one of the two or more distinct catalytically active species comprises two pentafluorophenyl ligands.

12. The method of claim 1, where one of the two or more distinct catalytically active species comprises three pentafluorophenyl ligands.

13. The method of claim 1, where one of the two or more distinct catalytically active species comprises two pentafluorophenyl ligands and a second of the two or more distinct catalytically active species comprises three pentafluorophenyl ligands.

14. The method of claim 1, where one of the two or more distinct catalytically active species comprises a bimetallic species with chlorides bridging two metal centers.

15. The method of claim 1, where the two metal centers comprise nickel and magnesium.

16. The method of claim 1, where the two or more distinct catalytically active species are represented by at least two of Formulae II, III, IV or V

(II)

(III)

(IV)

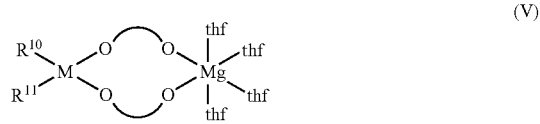

(V)

where M is a Group 10 metal or metal ion independently selected from one or more from the group consisting of nickel, palladium and platinum; X is a halogen; $R^5$, $R^6$, $R^7$, $R^8$, $R^9$, $R^{10}$ and $R^{11}$ are each independently selected from the group consisting of halophenyls, haloalkylsubstituted halophenyls, halomethylphenyls, haloalkyl ligands; L is a solvent ligand or a ligand selected from the group consisting of halo ligands, acetylacetonate, ethylhexanoate, naphthenate, acetate, trifluoroacetate hexafluoroacetylacetonate, cyclohexanebutyrate, octanoate, propionate; and Z is a countercation selected from a Mg cation, a Mg cation complex, and a complex comprising a Mg cation coordinated with ligand L where L is a non-solvent ligand capable of bridging, and where Mg is in the 2+ oxidation state, r and s are independently 1 or 2, and where the p and q have a value of 1 or 2 such that the Group 10 metal complex is neutral.

17. A cycloolefin polymerization catalyst, comprising:
a Group 10 metal complex comprising at least two structures represented by Formulae II, III, IV or V

(II)

(III)

(IV)

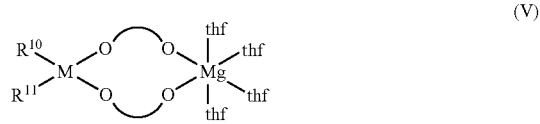

(V)

where M is a Group 10 metal or metal ion independently selected from one or more from the group consisting of nickel, palladium and platinum; X is a halogen; $R^5$, $R^6$, $R^7$, $R^8$, $R^9$, $R^{10}$ and $R^{11}$ are each independently selected from the group consisting of halophenyls, haloalkylsubstituted halophenyls, halomethylphenyls, haloalkyl ligands; L is a solvent ligand or a ligand selected from the group consisting of halo ligands, acetylacetonate, ethylhexanoate, naphthenate, acetate, trifluoroacetate hexafluoroacetylacetonate, cyclohexanebutyrate, octanoate, propionate; and Z is a countercation selected from a Mg cation, a Mg cation complex, and a complex comprising a Mg cation coordinated with ligand L where L is a non-solvent ligand capable of bridging, and where Mg is in the 2+ oxidation state, r and s are independently 1 or 2, and where the p and q have a value of 1 or 2 such that the Group 10 metal complex is neutral.

18. A method of making a polymer, comprising contacting, in situ, a Group 10 metal catalyst having two or more distinct catalytically active species with an olefin monomer to form the polymer, the in situ Group 10 metal catalyst made by first contacting a hydrocarbyl magnesium halide, represented by $R^H MgX$ where $R^H$ is a non-halogenated hydrocarbyl and X is a halogen, with a halohydrocarbyl compound, represented by $R^F X$, where $R^F$ is a halogenated hydrocarbyl and X is a halogen, to form a halohydrocarbyl Grignard, represented by $R^F MgX$, and second contacting the halohydrocarbyl Grignard with a Group 10 metal compound to form the in situ Group 10 metal catalyst, the Group 10 metal catalyst having two or more distinct catalytically active species.

19. The method of claim 18, contacting the in situ Group 10 metal catalyst with a first cycloolefin monomer and a second cycloolefin monomer, the first cycloolefin monomer different from the second cycloolefin monomer.

20. The method of claim 18, wherein the cycloolefin monomer comprises a compound represented by Formula C:

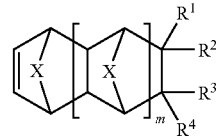

(C)

where X is selected from $—CH_2—$, $—CH_2—CH_2—$, or $—O—$; m is an integer from 0 to 5; and $R^1$, $R^2$, $R^3$, and $R^4$ are independently selected from hydrogen, a hydrocarbyl containing from 1 to 20 carbon atoms, a halohydrocarbyl containing from 1 to 20 carbon atoms, and perhalocarbyl containing from 1 to 20 carbon atoms, where such hydrocarbyl, halohydrocarbyl and perhalocarbyl groups optionally comprise one or more heteroatoms selected from O, N, S, P, Si, and groups represented by the formula:

-A-Y where A is an optional bridging group comprising a $C_1$ to $C_{20}$ hydrocarbyl, halohydrocarbyl or perhalocarbyl group or such a group that comprises one or more heteroatoms selected from O, N, S, P and Si, and Y is a functional group comprising a substituted or unsubstituted maleimido, a trialkoxysilyl, a hydroxyalkyl acetate, a hydroxyperfluoroalkyl, an alkylglycidyl ether or other epoxy-containing group, a perfluoroalkylsulfonamide, and a carboxylic acid derivative such as an ester or anhydride.

\* \* \* \* \*